US012698786B2

(12) United States Patent
Erhardt et al.

(10) Patent No.: US 12,698,786 B2
(45) Date of Patent: Aug. 4, 2026

(54) IMPLEMENT BRAKING SYSTEM

(71) Applicant: Doosan Bobcat North America, Inc.,
West Fargo, ND (US)

(72) Inventors: Cody Erhardt, Bismarck, ND (US);
Daniel J. Krieger, Bismarck, ND (US);
William Jacobson, Audubon, MN (US)

(73) Assignee: Doosan Bobcat North America, Inc.,
West Fargo, ND (US)

( * ) Notice: Subject to any disclaimer, the term of this
patent is extended or adjusted under 35
U.S.C. 154(b) by 362 days.

(21) Appl. No.: 18/463,401

(22) Filed: Sep. 8, 2023

(65) Prior Publication Data

US 2024/0084825 A1      Mar. 14, 2024

Related U.S. Application Data

(60) Provisional application No. 63/405,085, filed on Sep. 9, 2022.

(51) Int. Cl.
| | |
|---|---|
| *F15B 15/00* | (2006.01) |
| *F15B 13/02* | (2006.01) |
| *F15B 13/04* | (2006.01) |
| *F15B 15/24* | (2006.01) |
| *F16D 57/06* | (2006.01) |

(52) U.S. Cl.
CPC ............ *F15B 15/24* (2013.01); *F15B 13/024*
(2013.01); *F15B 13/0401* (2013.01); *F16D*
*57/06* (2013.01)

(58) Field of Classification Search
CPC .... F15B 13/024; F15B 13/0401; F15B 15/24;
F15B 2211/7058; F16D 57/06
See application file for complete search history.

(56) References Cited

U.S. PATENT DOCUMENTS

| | | | |
|---|---|---|---|
| 10,260,627 | B2 | 4/2019 | Lacher |
| 10,746,200 | B1 * | 8/2020 | Adeeb ...................... B62D 5/07 |
| 2006/0032222 | A1 | 2/2006 | Slattery et al. |
| 2016/0281745 | A1 * | 9/2016 | Shang ....................... F02N 7/00 |
| 2019/0141897 | A1 * | 5/2019 | Daining ................. A01D 69/10 |
| | | | 56/11.9 |
| 2020/0123739 | A1 * | 4/2020 | Lizotte ................ F16H 61/4043 |
| 2021/0332559 | A1 * | 10/2021 | Metzger .................. F15B 7/008 |
| 2024/0337092 | A1 * | 10/2024 | Hamamoto ............. F15B 19/00 |

FOREIGN PATENT DOCUMENTS

| | | | |
|---|---|---|---|
| EP | 3488685 A | 5/2019 | |
| JP | H007158026 A | 6/1995 | |
| JP | 2015224111 A | 12/2015 | |
| WO | WO-2020078555 A1 * | 4/2020 | ............ E02F 9/2066 |

OTHER PUBLICATIONS

International Searching Authority, International Search Report and
Written Opinion from corresponding International Application No.
PCT/US2024/055372, mailed Mar. 18, 2025 [9 pgs].
International Searching Authority, International Search Report and
Written Opinion issued in counterpart International Application
PCT/US2023/073699, mailed Dec. 5, 2023 [16 pgs].

* cited by examiner

*Primary Examiner* — Eyamindae C Jallow
(74) *Attorney, Agent, or Firm* — Quarles & Brady LLP

(57) ABSTRACT

A power machine can include a frame, a power source, a
machine hydraulic system, and a rotary implement remov-
ably securable to the frame. The machine hydraulic system
can provide operational hydraulic power to a hydraulic
motor of the rotary implement through an implement
hydraulic circuit. In an implement braking mode, flow of
hydraulic fluid through the implement hydraulic circuit can
provide braking for the hydraulic motor.

20 Claims, 18 Drawing Sheets

1100

OPERATE A HYDRAULIC MOTOR OF A
ROTARY ATTACHMENT WITH HYDRAULIC
POWER FROM A POWER MACHINE          1110

OPERATE THE ROTARY ATTACHMENT
IN A BRAKING MODE          1120

CONTROL A HYDRAULIC SYSTEM TO
SELECTIVELY PROVIDE FLOW ALONG A
BRAKING OR BYPASS FLOW PATH          1130

IMPLEMENT BRAKING SYSTEM

CROSS-REFERENCE TO RELATED APPLICATIONS

This application claims priority to U.S. Provisional Application No. 63/405,085, titled "IMPLEMENT BRAKING SYSTEM" and filed Sep. 9, 2022, the entirety of which is incorporated herein by reference.

BACKGROUND

This disclosure is directed toward power machines. More particularly, the present disclosure is directed to implement braking systems for power machines having implements that are operably coupled thereto. Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors including compact tractors, and trenchers, to name a few examples. Other types of power machines can include mini-loaders (e.g., mini track loaders), and mowers.

Different types of power machines, including skid-steer loaders, compact track loaders, excavators and the like can be configured to operate various implements that can be operably coupled to the power machine. Some implements can be physically attached to a power machine, while others can be operably coupled to a power system on the power machine but otherwise unattached to the machine. Some implements include a rotary member that is caused to rotate by a hydraulic motor on the implement, which is adapted to be powered by flow of hydraulic fluid from a hydraulic system of the power machine.

The discussion above is merely provided for general background information and is not intended to be used as an aid in determining the scope of the claimed subject matter.

SUMMARY

Examples according to this disclosure can provide an implement braking system for a power machine with a rotary implement. For example, in some cases, a power machine can include a rotary implement and a braking system can be configured to operate in an implement braking mode, after an implement operating mode, to provide improved braking performance of a rotary member of the rotary implement.

Some examples of the disclosure provide a power machine configured to operate in an implement braking mode and including a frame and a power source supported by the frame. A machine hydraulic system can be supported on the frame and powered by the power source. The machine hydraulic system can include a first interface hydraulic port (e.g., a machine mounted hydraulic port), a second interface hydraulic port, a fluid reservoir in communication with the first and second interface hydraulic ports, a fluid pump in fluid connection with the fluid reservoir and the first and second interface hydraulic ports, a fluid cooler in fluid connection with the fluid reservoir and configured to cool fluid received into the machine hydraulic system, and a machine control valve configured to control flow through the machine hydraulic system, including flow between the fluid reservoir and the first and second interface hydraulic ports. A rotary implement can be removably secured to the power machine. The rotary implement can have a hydraulic motor in fluid connection with the first and second interface hydraulic ports through an implement hydraulic circuit of the rotary implement. The implement hydraulic circuit can include a first interface hydraulic port and a second interface hydraulic port that are configured to hydraulically connect to the first and second interface hydraulic ports such that the hydraulic motor of the rotary implement is configured to receive pressurized hydraulic fluid through the implement hydraulic circuit. In the implement braking mode, the machine control valve can be positioned to permit flow from the second interface hydraulic port to the fluid reservoir through the fluid cooler. In the implement braking mode, the implement hydraulic circuit can permit flow along: a first flow path, from a hydraulic connection between the first interface hydraulic port and the first interface hydraulic port to the second interface hydraulic port; and a second flow path, from a motor outlet of the hydraulic motor to the second interface hydraulic port. The first flow path can bypass the hydraulic motor, and the second flow path can be configured to impose a pressure drop between the motor outlet and the implement hydraulic outlet.

In some examples, wherein the implement hydraulic circuit further includes a bypass control valve and a brake valve. The bypass control valve can be configured to control flow of fluid having at least a first pressure from the first interface hydraulic port along the first flow path to the second interface hydraulic port. The brake valve can be configured to move from a first position to a second position when flow from the motor outlet has at least a second pressure, to permit flow along the second flow path to the second interface hydraulic port, the second pressure being greater than the first pressure. In the implement braking mode, the bypass control valve can permit a bypass flow along the first flow path from upstream of a motor inlet of the hydraulic motor to the second interface hydraulic port when flow from the first interface hydraulic port exceeds the first pressure. The bypass control valve can block flow from the motor outlet to the implement hydraulic outlet. In the implement braking mode, the brake valve can permit flow from the motor outlet to the second interface hydraulic port along the second flow path when the motor outlet exceeds the second pressure.

In some examples, the brake valve can be a pressure relief valve disposed to provide the second pressure as a set pressure to permit flow along the second flow path.

In some examples, the machine control valve can be a spool valve configured to control flow area for hydraulic flow between the machine hydraulic inlet and the fluid cooler. The spool valve can be configured to be moveable from an open configuration to a closed position.

In some examples, the machine control valve can be in the open configuration when the power machine is in the implement braking mode and when the power machine is in an implement operating mode. The machine control valve can be in the closed position when the power machine is in a non-operating mode for the rotary implement.

In some examples, the rotary implement can include a rotating cutting element coupled to the hydraulic motor.

Some examples of the disclosure provide a rotary implement configured to be removably attached to a power machine. A hydraulic motor can have a motor inlet and a motor outlet. An implement hydraulic circuit can be in fluid communication with the motor inlet and the motor outlet. The hydraulic circuit can have a first interface hydraulic port and a second interface hydraulic port configured to be removably secured in fluid communication with a hydraulic system of a power machine to provide flow into the implement hydraulic circuit from the power machine and flow from the implement hydraulic circuit to the power machine. The hydraulic circuit can be configured to operate in an operating configuration and in a braking configuration. In the operating configuration, the hydraulic circuit can route a driving hydraulic flow received at one of the first or the second interface hydraulic ports through the hydraulic motor to drive the hydraulic motor. In the braking mode, the hydraulic circuit can route hydraulic flow received at one of the first or the second interface hydraulic ports from the power machine through the hydraulic motor to brake the hydraulic motor.

In some examples, in an operating configuration, the implement hydraulic circuit can route the driving hydraulic flow from the first interface hydraulic port to the motor inlet and from the motor outlet to the second interface hydraulic port. In a braking configuration, the implement hydraulic circuit can route the braking hydraulic flow from the second interface hydraulic port to the motor inlet and from the motor outlet to the first interface hydraulic port.

In some examples, the implement hydraulic circuit can include a brake valve arranged along a return flow path that extends between the motor outlet and the first interface hydraulic port. The brake valve can be configured: to be in a first position in response to when a first pressure is exhibited at the motor outlet; and to move from the first position to a second position in response to a second pressure at the motor outlet that is greater than the first pressure, to permit flow from the motor outlet, across the brake valve, to the first interface hydraulic port.

In some examples, the brake valve can be a pressure relief valve.

In some examples, a bypass control valve can be configured to be in a first position in the operating configuration and a second position in the braking configuration. In the first position, the bypass control valve can permit flow of fluid having a first pressure to bypass the brake valve, to flow from the motor outlet to the second interface hydraulic port. In the second position, the bypass control valve can block flow from the motor outlet to the second interface hydraulic port of fluid having a second pressure, higher than the first pressure. In some examples, the bypass control valve can permit flow through the bypass control valve from the second interface hydraulic port to the motor inlet.

In some examples, the implement hydraulic circuit can further include a second brake valve. The second brake valve can be configured to move from a first position to a second position in response to fluid flow having a third pressure that is smaller than the first pressure. In a second braking configuration, the second brake valve can route a second braking flow from the motor outlet across the second brake valve to the motor inlet.

In some examples, in the second braking configuration, a bypass control valve can be in the first position so that fluid having the second pressure can bypass the brake valve to flow from the motor outlet across the second brake valve to the motor inlet via the second brake valve.

In some examples, the bypass control valve can be in the second position to permit flow through the bypass control valve from the second interface hydraulic port to the motor inlet.

In some examples, the bypass control valve can be in a pilot-operated valve arranged to be moved between the first and second positions based on a sensed pressure between the bypass control valve and the second interface hydraulic port.

In some examples, in an operating configuration, the implement hydraulic circuit can be configured to route a portion of the driving hydraulic flow along an anti-cavitation flow path to return the portion of the driving hydraulic flow from the motor outlet to the motor inlet.

In some examples, the implement hydraulic circuit can include an anti-cavitation control valve. The anti-cavitation control valve can be configured to permit flow of the portion of the driving hydraulic flow along the anti-cavitation flow path based on a second pressure between the first interface hydraulic port and the motor inlet.

In some examples, the implement hydraulic circuit can further include a braking valve arranged in parallel with the anti-cavitation control valve relative to flow from the motor outlet and the motor inlet.

Some examples of the disclosure provide a method of operating a hydraulic-powered rotary implement that can be attached to a power machine. The method can include powering rotation of a hydraulic motor of the rotary implement with an implement hydraulic circuit of the rotary implement in an operating configuration. The method can provide a driving hydraulic flow from a power machine hydraulic system to the implement hydraulic circuit via one of a first or second interface hydraulic ports. The first or the second interface hydraulic circuit can provide hydraulic communication between the implement hydraulic circuit and the power machine hydraulic system. With the implement hydraulic circuit in a braking configuration, the method can include braking rotation of the hydraulic motor. The method can provide a braking hydraulic flow from the power machine hydraulic system to the implement hydraulic circuit via one of the first or second hydraulic ports. The braking hydraulic flow can return from the implement hydraulic circuit to the power machine hydraulic system to be cooled by a hydraulic cooler of the power machine.

In some examples of operating the hydraulic-powered rotary, the power machine can provide the driving hydraulic flow to the implement hydraulic circuit via the first interface hydraulic port. The driving hydraulic flow can flow across the hydraulic motor from a motor inlet to a motor outlet and return from the implement hydraulic circuit to the power machine hydraulic system via the second interface hydraulic port. The power machine can provide the braking hydraulic flow to the implement hydraulic circuit via the first interface hydraulic port. The braking hydraulic flow can flow across the hydraulic motor from the motor inlet to the motor outlet and return from the implement hydraulic circuit to the power machine hydraulic system via the first interface hydraulic port.

In some examples of operating the hydraulic-powered rotary implement, the implement hydraulic circuit can include a brake valve and a bypass control valve. In the braking configuration, the bypass control valve can provide a bypass flow path from the second interface hydraulic port to a motor inlet. The bypass control valve can provide flow across the hydraulic motor from the motor inlet to a motor outlet. To brake the hydraulic motor, the brake valve can provide a return flow path from the motor outlet to the first interface hydraulic port.

In some examples of operating the hydraulic-powered rotary implement, the implement hydraulic circuit in the braking configuration can cause a first portion of the braking hydraulic flow to flow from the bypass valve to the first interface hydraulic port without flowing across the hydraulic motor. Further, the implement hydraulic circuit in the braking configuration can cause a second portion of the braking-mode hydraulic flow to flow to across the motor to the brake valve and the braking flow path.

In some examples, operating the hydraulic-powered rotary implement can further include braking rotation of the hydraulic motor with a recirculating hydraulic flow within the implement hydraulic circuit with the implement hydraulic circuit in a second braking configuration.

In some examples of operating the hydraulic-powered rotary implement, the driving hydraulic flow can be provided by the power machine hydraulic system in response to a first operator command for a master spool valve of the power machine hydraulic system. The driving hydraulic flow can cause the implement hydraulic circuit to operate in an operating configuration. In response to a second operator command for the master spool valve, the braking hydraulic flow can be provided by the power machine hydraulic system. The braking hydraulic flow can cause the implement hydraulic circuit to operate in a braking configuration. In response to a third operator command for the master spool valve, the power machine hydraulic system can provide no flow to cause the implement hydraulic circuit to operate in the second braking configuration.

Some examples of the disclosure provide a hydraulic-powered rotary implement for a rotary implement of a power machine. A hydraulic motor can have a motor inlet and a motor outlet. An implement hydraulic circuit can provide hydraulic communication between a first interface hydraulic port for flow to or from a power machine hydraulic system of the power machine, and a second interface hydraulic port for flow to or from the hydraulic system of the power machine. The first and second interface hydraulic ports can be fluidically coupled to the motor inlet and the motor outlet for flow between the power machine hydraulic system, the motor inlet, and the motor outlet. The implement hydraulic circuit can include a braking flow path that provides fluid communication between an inlet of a brake valve and the motor outlet, between an outlet of the brake valve and the motor inlet, and between the outlet of the brake valve and the first interface hydraulic port for outflow from the implement hydraulic circuit to the power machine hydraulic system. In a braking configuration, fluid from the motor outlet can be routed to the braking flow path.

In some examples of the hydraulic-powered rotary implement, the implement hydraulic circuit can be configured to divide hydraulic flow in a braking configuration. The hydraulic flow can be received from the outlet of the brake valve between the motor inlet and the first interface hydraulic port.

Some examples of disclosure provide a method of braking a rotary implement. Rotation of a hydraulic motor of the rotary implement can be powered with flow from a first interface hydraulic port to a second interface hydraulic port, including flow across the hydraulic motor from a motor inlet to a motor outlet. A braking-mode hydraulic flow can be provided from the second interface hydraulic port to the first interface hydraulic port to operate the rotary implement in an implement braking mode. In the implement braking mode, a brake valve can provide a braking flow path from the motor outlet to the first interface hydraulic port. The bypass valve can also provide a bypass flow path from the second interface hydraulic port to the motor inlet to provide flow across the motor from the motor inlet to the motor outlet.

In some examples of braking the rotary implement, operating in the implement braking mode can include causing a first portion of the braking hydraulic flow to flow from the bypass valve to the first interface hydraulic port without flowing across the hydraulic motor. The operation can further include causing a second portion of the braking-mode hydraulic flow to flow to across the motor to the brake valve and the braking flow path.

Some examples of the disclosure provide a power machine with a frame, a power source supported by the frame, a machine hydraulic system, and a rotary implement. The machine hydraulic system can be supported by the frame and powered by the power source. The machine hydraulic system can include a first interface hydraulic port, a second interface hydraulic port, a fluid reservoir in fluid communication with the first and second interface hydraulic ports, a fluid pump configured to pump fluid from the fluid reservoir to either of the first or second interface hydraulic ports, and a machine control valve configured to control flow through the machine hydraulic system. The rotary implement can be secured to the frame of the power machine and can have a hydraulic motor to power rotation of a rotary work element. The hydraulic motor can be arranged to be powered in an operational mode by an implement hydraulic circuit with a first interface hydraulic port receiving hydraulic flow from the machine hydraulic system at the first interface hydraulic port and a second interface hydraulic port providing hydraulic flow to the machine hydraulic system at the second interface hydraulic port. The power machine can be configured to selectively operated in an implement braking mode, in which the machine control valve can be controlled to provide a reversed flow of hydraulic fluid between the machine hydraulic system and the implement hydraulic circuit to brake rotation of the rotary work element. The reversed flow can flow from the machine hydraulic system into the implement hydraulic circuit at the second interface hydraulic port and flow out of the implement hydraulic circuit to the machine hydraulic system at the first interface hydraulic port.

Some examples of the disclosure provide a method of braking a rotary implement. A fluid flow from a power source external to the rotary implement into the rotary implement can be controlled during a braking mode to brake the rotary implement. The rotary implement can include a rotary member that, when operating at a maximum rotational speed, generates at least 50 kilojoules. In the braking mode, braking of the rotary implement to less than 5% of the maximum rotational speed can be accomplished within 30 seconds after the braking mode can be initiated.

In some examples, the rotary member, when operating at the maximum rotational speed, generates at least 250 kilojoules or at least 1,000 kilojoules.

In some examples, the braking of the rotary implement to less than 1% of the maximum rotational speed can be accomplished within 30 seconds after the braking mode is initiated.

In some examples, the braking of the rotary implement to a complete stop can be accomplished within 30 seconds after the braking mode is initiated.

In some examples, a pressure actuated braking valve can be provided. A rate of dissipation of energy from the rotary implement can be determined in part by a set pressure at which the braking valve can be actuated.

In some examples, a fluid return path can be provided from the rotary implement to an operably coupled machine, and a machine installed cooler can cool returned fluid that can be received from the rotary implement along the fluid return path. The returned fluid can be replaced on the rotary implement with previously cooled fluid from the machine installed cooler.

Some examples provide a method of braking a rotary implement that can be removably connectable to a power machine. A fluid flow into the rotary implement can be controlled during a braking mode to brake the rotary implement. The fluid flow can be provided by the power machine. A fluid return path to the machine can be provided and the returned fluid can be cooled with a machine installed cooler. The returned fluid can be replaced into the rotary implement with previously cooled fluid.

In some examples, the previously cooled fluid can be stored in a reservoir on the power machine.

Some examples can provide a power machine that includes a frame, a power source mounted to the frame, and a hydraulic system powered by the power source. The hydraulic system can be adapted to selectively providing pressurized hydraulic fluid in one of a first direction or a second direction. A fluid reservoir can be supported by the frame. A fluid pump can be in fluid connection with the fluid reservoir and configured to pump fluid from the fluid reservoir to one or more of the first or second interface hydraulic ports. A fluid cooler can be in fluid connection with the fluid reservoir and configured to cool fluid received by one or more of the first or second interface hydraulic ports. A machine mounted hydraulic control system can be configured to control flow through the machine mounted hydraulic system, including flow from the first or second interface hydraulic ports to the fluid reservoir. A rotary implement can be removably secured to power machine. The rotary implement can have a hydraulic motor in fluid connection with the first and second interface hydraulic ports through an implement hydraulic circuit of the rotary implement. The implement hydraulic circuit can include a first implement hydraulic port and a second implement hydraulic port that can be connectable to the first and second interface hydraulic ports such that the hydraulic motor of the rotary implement can be configured to be powered by the fluid pump through the implement hydraulic circuit. The power machine can be configured to selectively operate in an implement operating mode, in which flow from the fluid pump can be received by the first implement hydraulic port of the implement hydraulic circuit to power the hydraulic motor. Further, the power machine can be configured to selectively operate in an implement braking mode, in which flow from the fluid pump can be received by the second implement hydraulic port of the implement hydraulic circuit to brake the rotary implement.

Some examples can provide a power machine that includes a frame, a power source, a hydraulic system powered by the power source, and a rotary implement removably secured to the power machine. The hydraulic system can include an interface configured to selectively provide pressurized hydraulic fluid to an attached implement in either of a first direction or a second direction. The rotary implement can have a hydraulic motor in fluid connection with an implement hydraulic circuit. The implement hydraulic circuit can be connected to the interface for hydraulic flow between the hydraulic system and the implement hydraulic circuit. The power machine can be configured to selectively operate in an implement operating mode, in which flow from the fluid pump can be provided to the rotary implement in the first direction to power the hydraulic motor. Also, the power machine can be configured to selectively operate in an implement braking mode, in which flow from the fluid pump can be provided to the rotary implement in the second direction to brake the rotary implement.

In some examples, the implement braking mode can be a first implement braking mode and the power machine can be further configured to selectively operate in a second implement braking mode. In the second implement braking mode, the implement hydraulic circuit can provide a flow, on the rotary implement, from a motor outlet of the hydraulic motor to a motor inlet of the hydraulic motor to brake the rotary implement.

Some examples can provide a power machine that includes a frame, and a power source. A machine hydraulic system can be powered by the power source. The machine hydraulic system can include a first machine hydraulic port, a second machine hydraulic port, a fluid reservoir disposed between the first and second machine hydraulic ports, a fluid pump in fluid connection with the fluid reservoir and configured to pump fluid from the fluid reservoir to one of the first or second machine hydraulic ports, a fluid cooler in fluid connection with the fluid reservoir and configured to cool fluid received by one of the first or second machine hydraulic ports, and a machine hydraulic control system configured to control flow through the machine hydraulic system, including flow from the first or second machine hydraulic ports to the fluid reservoir. A rotary implement can be removably secured to the power machine. The rotary implement can have a hydraulic motor that can be operably connected to a rotary element for work operations and can be in fluid connection with the first machine hydraulic port and the second machine hydraulic port through an implement hydraulic circuit of the rotary implement. The implement hydraulic circuit can include a first implement hydraulic port arranged to provide a flow connection with the first machine hydraulic port, a second implement hydraulic port arranged to provide a flow connection with the second machine hydraulic port, a brake valve arranged along a braking flow path between an outlet of the hydraulic motor and the first implement hydraulic port, and a control valve. The brake valve can be configured to move from a first position to a second position when flow from the outlet of the hydraulic motor has at least a first pressure. The brake valve can also permit flow from the outlet of the hydraulic motor along the braking flow path. The control valve can be controllably movable between a first position and a second position. In a first position, the control valve can direct a first flow of fluid from a motor outlet of the hydraulic motor along a powered-operation flow path to the second implement hydraulic port, so that the hydraulic motor can be powered by flow from the first implement hydraulic port. In the second position, the control valve can direct a second flow of fluid from the second implement hydraulic port to an inlet of the hydraulic motor and can block flow along the powered-operation flow path, so that flow from the outlet of the hydraulic motor with at least the first pressure flows along the braking flow path to provide braking power for the rotary implement.

In some examples, a second brake valve can be configured to move from a first position to a second position. When the first flow of fluid along the powered-operation flow path has at least a second pressure smaller than the first pressure, moving the second brake valve from the first to second position can permit flow from the powered-operation flow path to the inlet of the hydraulic motor and thereby provide braking power for the rotary implement.

Some examples can provide a method of braking a rotary implement. The method can include controlling a flow of hydraulic fluid from a hydraulic system that is external to the rotary implement to brake the rotary implement and thereby heat the hydraulic fluid. The method can further include receiving a return flow of the heated hydraulic fluid from the rotary implement to the hydraulic system to cool the return flow with a cooler of the hydraulic system.

Some examples can provide an implement configured to be operably coupled to a hydraulic power source on a power machine. The implement can include a rotary actuator powered by a rotary motor, and a hydraulic circuit that is adapted to connect with a hydraulic power source on the power machine and can provide pressurized fluid to the motor and returning pressurized fluid to the power machine. The hydraulic circuit can provide a first path from the machine to the motor and back to the machine to allow the rotary motor to operate in rotary actuator a first operating mode. The hydraulic circuit can provide a second path from the machine to the motor and back to the machine, the second path creating an increased pressure drop, as compared to the first path, to brake the rotary motor.

Some examples can provide a rotary implement configured to be removably attached to a power machine. A hydraulic motor can have a motor inlet and a motor outlet. A hydraulic circuit can be in fluid communication with the motor inlet and the motor outlet. The hydraulic circuit can be configured to be removably secured in fluid communication with a power machine to receive pressurized hydraulic fluid from and return pressurized hydraulic fluid to the power machine. The hydraulic circuit can be configured to operate in an operating configuration and in a braking configuration. In the operating configuration, the hydraulic circuit can route hydraulic flow from received from the power machine through the hydraulic motor to drive the hydraulic motor. In the braking mode, the hydraulic circuit can route hydraulic flow received from the power machine through the hydraulic motor to brake the hydraulic motor.

This Summary and the Abstract are provided to introduce a selection of concepts in a simplified form that are further described below in the Detailed Description. This Summary is not intended to identify key features or essential features of the claimed subject matter, nor are they intended to be used as an aid in determining the scope of the claimed subject matter.

DRAWINGS

The following drawings are provided to help illustrate various features of non-limiting examples of the disclosure and are not intended to limit the scope of the disclosure or exclude alternative implementations.

DETAILED DESCRIPTION

Figure 1:
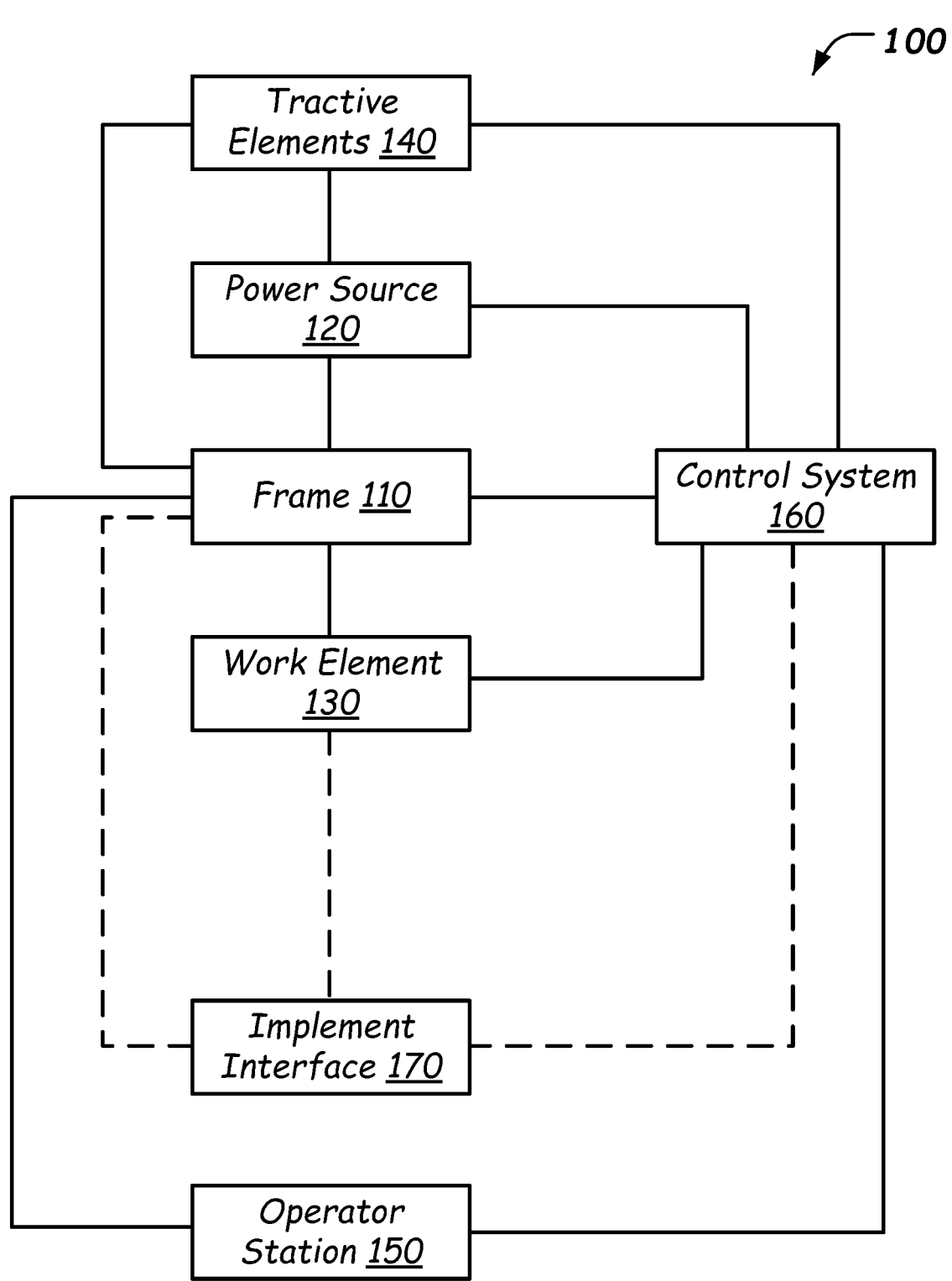
FIG. 1 is a block diagram illustrating functional systems of a representative power machine on which examples of the present disclosure can be advantageously practiced.

The concepts disclosed in this discussion are described and illustrated by referring to exemplary examples. These concepts, however, are not limited in their application to the details of construction and the arrangement of components in the illustrative examples and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Conventional power machines may be configured to operate an implement that is operably coupled to the power machine by powering an actuator (e.g., a hydraulic motor) of the implement. Conventionally, actuators of implements of this type are powered by providing flow of pressurized hydraulic fluid from a hydraulic system of the power machine to the implement. Thus powered, for example, motors of an implement may be utilized to rotate a rotary member (e.g., a blade, a disc, or other rotary work element) of the implement. For the purposes of this discussion, such implements will be referred to generally as "rotary implements."

Some conventional rotary implement designs for heavy-duty applications require a rotary member that has a high moment of inertia, that rotates at a high speed (e.g., greater than about 800 revolutions per minute (RPM), 1,000 RPM, or 1,200 RPM), or both. During operation, this can generate a large amount of rotational energy that subsequently needs to be dissipated in a braking event. These implements can be useful, for example, for forestry cutter implements for brush-clearing operations. Generally, implements that operate with kinetic energy of 50 kilojoules (kJ) or more can be considered "high-energy" implements (e.g., with the operating kinetic energy calculated for a rotating blade or other rotary member based on the angular velocity and moment of inertia of the rotary member).

In conventional arrangements, once a rotary member is rotating at an operational speed, the rotary member often requires a substantial amount of time to come to rest even after active powering of the rotation has ceased (e.g., as the power machine moves from an implement operating mode, in which the power machine powers the motor of the implement to cause the rotary member to rotate, to an implement non-operating mode, in which the power machine stops powering the motor of the implement). Unless an operator "grounds out" the rotary member using material being processed, for example the operator may need to wait a long period of time for a rotary member to come to rest, decreasing operational efficiency and potentially increasing hydraulic fluid temperatures of the implement. Thus, it may be beneficial to provide an implement braking system for a power machine that significantly reduces an amount of time for a rotary member of an implement to stop rotating after power for operation of the implement is removed while not causing an excessive raise in the temperature of hydraulic fluid in the implement (e.g., beyond an operational maximum temperature).

Conventional rotary implements can incorporate a closed loop hydraulic circuit configuration in a hydraulic system of the implement to brake rotary members upon transition from an implement operating mode to an implement non-operating mode. The conventional configuration of the closed loop hydraulic system commonly utilizes an on-implement closed-loop flow of hydraulic fluid, through the motor, to slow unpowered (inertial) rotation of the rotary member via fluid resistance and frictional losses.

As generally described above, however, conventional closed loop hydraulic configurations for braking implements can still tend to require a substantial amount of time for the rotary member to stop rotating. In particular, this is because braking is accomplished only by hydraulic fluid flowing in the closed loop circuit. For example, in some applications, a high-energy rotary implement can require greater than 270 seconds for rotation of the rotary member to cease after transitioning from the implement operating mode to the non-operating mode. Moreover, conventional closed loop hydraulic configuration can result in excessive heating of the hydraulic fluid above operating specifications (e.g., for the fluid itself, for the hydraulic motor, etc.) as the rotational energy of the rotary member is absorbed as heat energy into the fluid of the implement. This can lead to a premature breakdown of the hydraulic fluid and potential damage to hydraulic components of the implement and the power machine. As a result, conventional hydraulic braking systems for rotary implements may be limited in their inability to reduce braking times by the need to maintain an acceptable temperature of hydraulic fluid of the implements.

Examples of the present disclosure can address these problems, for example, by providing an improved implement braking system for rotary implements and for power machines with attached rotary implements. Generally, hydraulic systems of the disclosed technology can be configured to operate in an implement braking mode, e.g., after transitioning from an implement operating mode, to brake (i.e., slow) rotation of a rotary member of the implement using hydraulic flow within the implement. In some examples, an implement braking mode provides braking to the rotary member while continuing a flow of hydraulic fluid between the power machine hydraulic system and the implement hydraulic system, as opposed to solely via a closed loop hydraulic system of the implement, as described above. Fluid returned to the power machine from the implement can be routed through a heat exchanger on the power machine to remove braking-induced heat from the fluid and the cooled fluid can then be returned to the implement. With this improved heat removable, examples of the disclosed technology can thus provide an improved braking rate compared to conventional systems while maintaining the temperature of the fluid within relevant operating temperature limits.

In some examples, an implement braking system can include an implement hydraulic system having a first flow path that bypasses a motor of the implement, and a second flow path that provides a pressure drop of flow from the motor outlet to an outlet of the implement hydraulic system during the implement braking mode. In some examples, flow from a power machine to an implement can be reversed to brake a motor of an implement, as compared to flow for powered operation of the motor.

Figure 2:
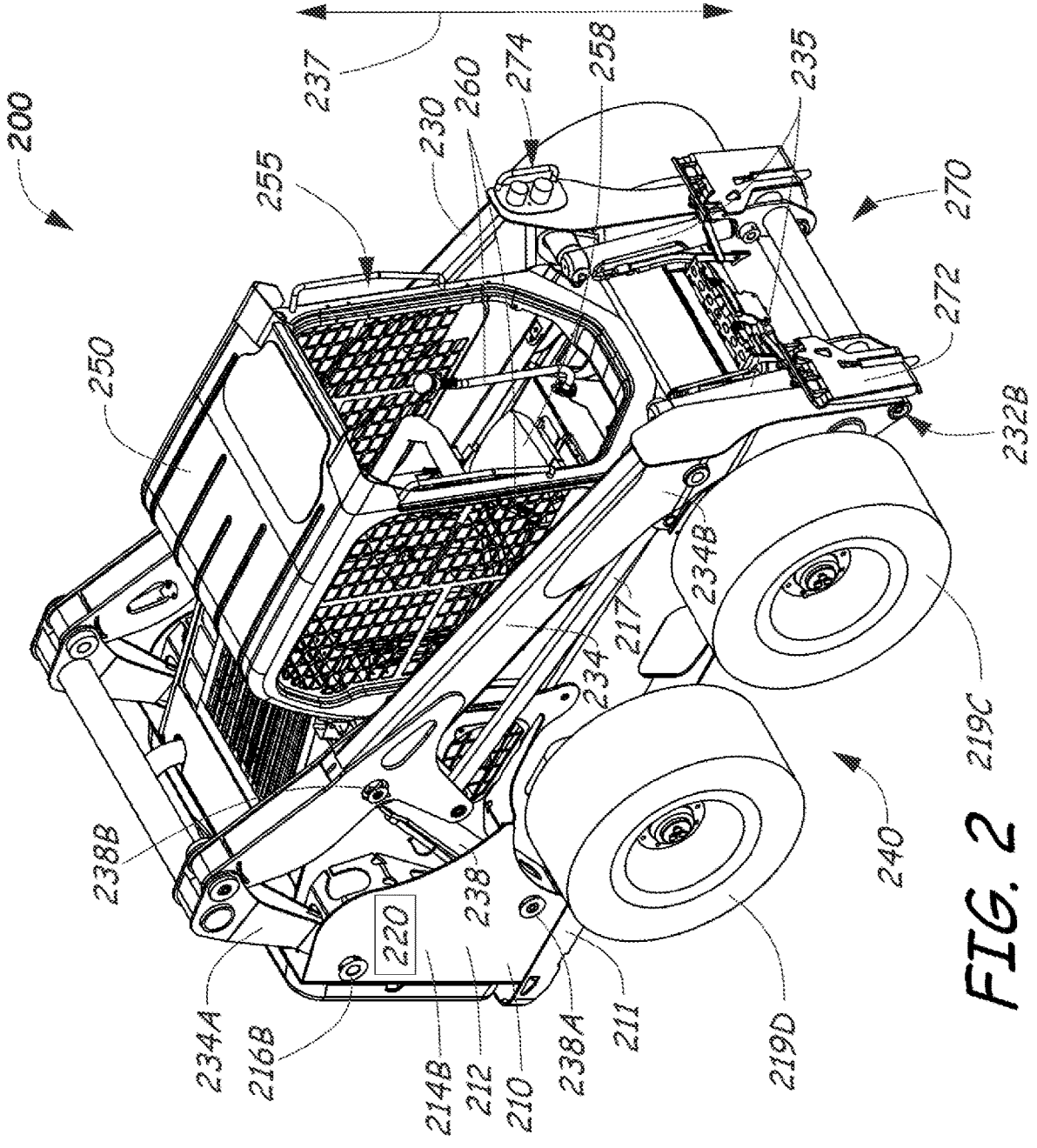
FIGS. 2 and 3 illustrate perspective views of a representative power machine in the form of a skid-steer loader of the type on which the disclosed examples can be practiced.
Figure 3:
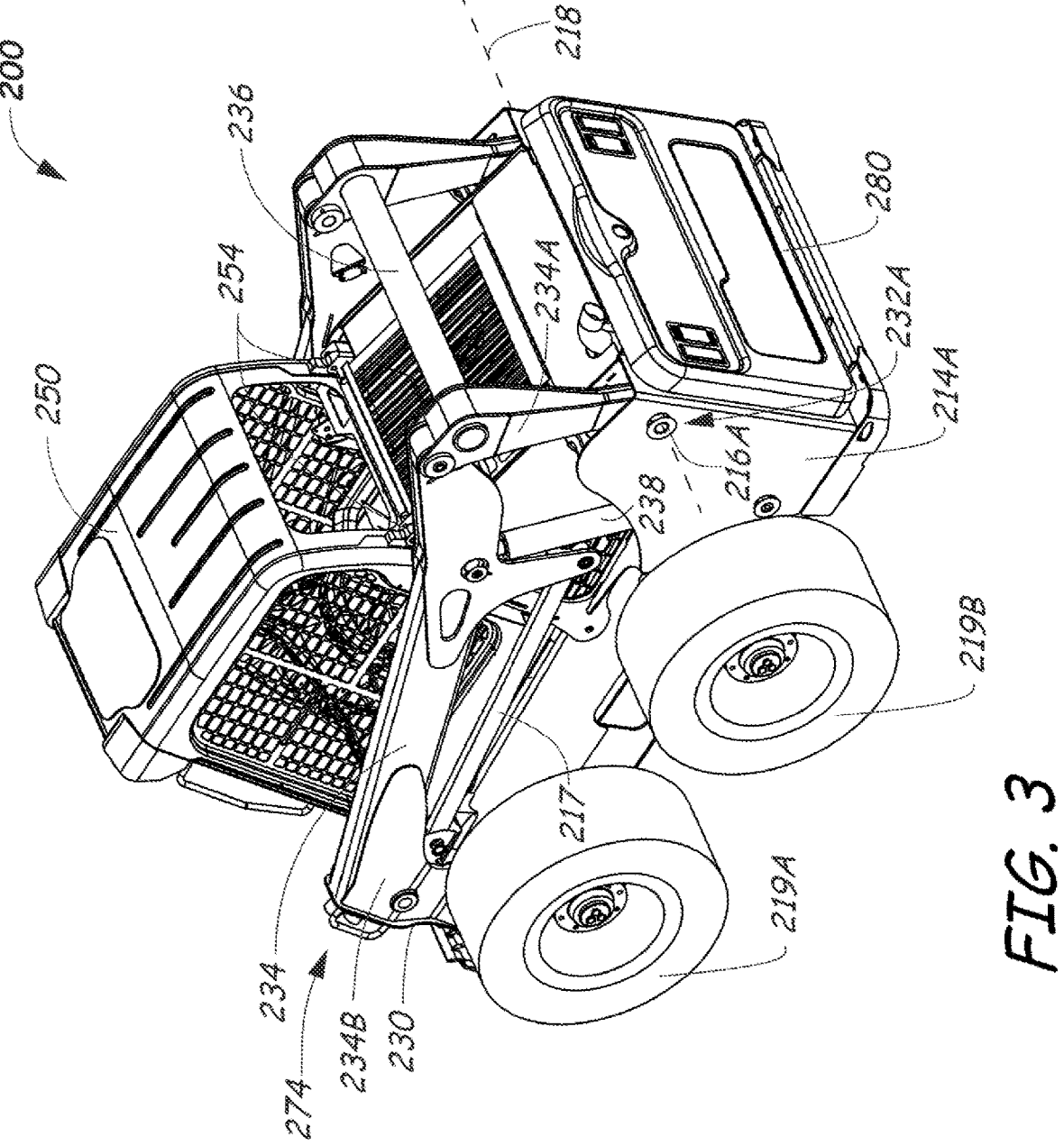

These concepts can be practiced on various power machines, as will be described below. Before any examples are disclosed, a representative power machine on which the examples can be practiced is illustrated in diagram form in FIG. 1 and one example of such a power machine is illustrated in FIGS. 2 and 3 and described below. For the sake of brevity, only one power machine is illustrated and discussed as being a representative power machine. However, as mentioned above, the examples below can be practiced on any of a number of power machines, including power machines of different types from the representative power machine shown in FIGS. 2 and 3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

FIG. 1 is a block diagram that illustrates the basic systems of a power machine 100, which can be any of a number of different types of power machines, upon which the examples discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interface 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. For example, the power machine can be a mower with a mower deck or other mower component as a work element, which may be movable with respect to the frame of the mower. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed examples may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e., from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e., remote from both of the power machine and any implement to which is it coupled) that is capable of controlling at least some of the operator-controlled functions on the power machine.

FIGS. 2 and 3 illustrate a loader 200, which is one particular example of a power machine of the type illustrated in FIG. 1 where the examples discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element (s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements. Correspondingly, although some example power machines discussed herein are presented as skid-steer power machines, some examples disclosed herein can be implemented on a variety of other power machines. For example, some implementations can be implemented on compact loaders or compact excavators that do not accomplish turns via skidding.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Loader 200 is described herein to provide a reference for understanding one environment on which the examples described below related to track assemblies and mounting elements for mounting the track assemblies to a power machine may be practiced. The loader 200 should not be considered limiting especially as to the description of features that loader 200 may have described herein that are not essential to the disclosed examples and thus may or may not be included in power machines other than loader 200 upon which the examples disclosed below may be advantageously practiced. Unless specifically noted otherwise, examples disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, which is capable of generating or otherwise providing power for operating various functions on the power machine. Power system 220 is shown in block diagram form in FIG. 2 but is located within the frame 210. Frame 210 also supports a work element in the form of a lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and secure various implements to the loader 200 for performing various work tasks and an implement power interface 274, to which an implement can be coupled for selectively providing power to an implement that might be connected to the loader. The implement power interface 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, or mechanical signals. Signals generated in response to operator input devices are provided to various components on the power machine for controlling various functions on the power machine. Among the functions that are controlled via operator input devices on loader 200 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible or visual indications. Audible indications can be made in the form of buzzers, bells, and the like or via verbal communication. Visual indications can be made in the form of graphs, lights, icons, gauges, alphanumeric characters, and the like. Displays can provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include or interacting with the examples discussed below can have various different frame components that support various work elements. The elements of frame 210 discussed herein are provided for illustrative purposes and frame 210 is not the only type of frame that a power machine on which the examples can be practiced can employ. Frame 210 of loader 200 includes an undercarriage or lower portion 211 of the frame and a mainframe or upper portion 212 of the frame that is supported by the undercarriage. The mainframe 212 of loader 200, in some examples is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly 230 to the mainframe 212) are collectively referred to as joints 216A, 216B (one is located on each of the upright portions 214) for the purposes of this discussion. Joints 216A, 216B are aligned along an axis 218 so that the lift arm assembly 230 is capable of pivoting, as discussed below, with respect to the frame 210 about axis 218. Other power machines may not include upright portions on either side of the frame or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A, 219B, 219C, 219D on either side of the loader 200.

The lift arm assembly 230 shown in FIGS. 2 and 3 is one example of many different types of lift arm assemblies that can be attached to a power machine such as loader 200 or other power machines on which examples of the present discussion can be practiced. The lift arm assembly 230 is what is known as a vertical lift arm, meaning that the lift arm assembly 230 is moveable (i.e., the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end 232A of each of the lift arms 234 is pivotally coupled to the power machine at one of joints 216A, 216B and a second end 232B of each of the lift arms is positioned forward of the frame 210 when in a lowered position as shown in FIG. 2. Joints 216A, 216B are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A that is pivotally coupled to the frame 210 at one of the joints 216A, 216B and a second portion 234B that extends from its connection to the first portion 234A to the second ends 232B of the lift arms 234. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A, 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216A, 216B and thereby be raised and lowered along a fixed path illustrated by arrow 237. Each of a pair of control links 217 are pivotally mounted to the frame 210 and one of the lift arms 234 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e., along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to the second ends 232B of the lift arms 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second ends 232B of the lift arms 234. Implement carrier actuators 235 are operably coupled to the lift arm assembly 230 and to the implement carrier 272 and are operable to rotate the implement carrier 272 with respect to the lift arm assembly 230. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. In the illustrated example, the implement carrier 272 provides a mounting structure for easily attaching an implement to the lift arm assembly 230 (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes the implement power interface 274 available for connection to an implement on the lift arm assembly 230. The implement power interface 274 includes pressurized hydraulic fluid port to which an implement can be removably coupled. The pressurized hydraulic fluid port selectively provides access to pressurized hydraulic fluid to be provided from the power machine to the implement for powering one or more functions or actuators on an implement. In some examples, the pressurized hydraulic fluid port includes at least two hydraulic couplers that can be connected to complementary couplers on an implement. In these arrangements, the power machine 200 can be configured to provide pressurized hydraulic fluid to either of the couplers with the other coupler being configured to receive returned fluid from the implement. For the purposes of clarity in this discussion, if pressurized hydraulic fluid is provided to one of the couplers, the pressurized hydraulic fluid is considered to be moving in a first direction (as it leaves and is returned to the power machine). Conversely, if pressurized hydraulic fluid is provided to the other of the couplers, it is considered to be moving in a second direction. Normally the first direction is one where engagement with a rotary actuator causes the rotary actuator to rotate in a preferred direction. (One of ordinary skill in the art will appreciate that this assumes a hydraulic circuit on the implement that provides an expected path to the actuator.) The implement power interface 274 can also include an electrical power interface for providing electrical power to power electrical actuators or an electronic controller on an implement. The implement power interface 274 also exemplarily includes electrical conduits that are in communication with a data bus on the loader 200 to allow communication between a controller on an implement and electronic devices on the loader 200. Although the implement power interface 274 of machine 200 is discussed as being on the lift arm assembly 230, in other examples, the implement power interface 274 can be located on other parts of the power machine 200 or other power machines.

Figure 4:
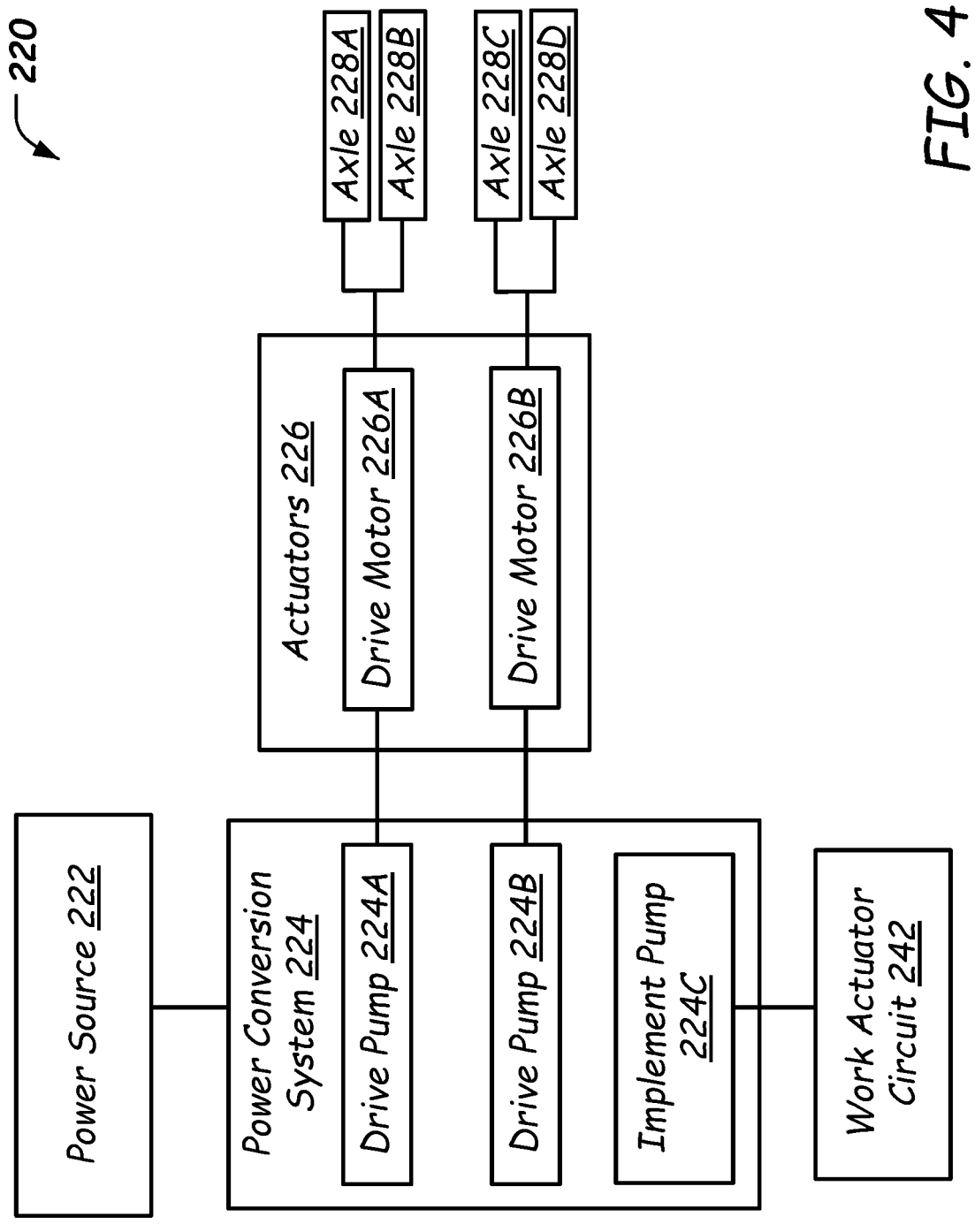
FIG. 4 is a block diagram illustrating components of a power system of a power machine, including the loader illustrated in FIGS. 2 and 3.

Frame 210 supports and generally encloses the power system 220 so that the various components of the power system 220 are not visible in FIGS. 2 and 3. FIG. 4 includes, among other things, a diagram of various components of the power system 220. Power system 220 includes one or more power sources 222 that are capable of generating or storing power for use on various machine functions. On loader 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of loader 200 includes a pair of hydrostatic drive pumps 224A, 224B, which are selectively controllable to provide a power signal to drive motors 226A, 226B. The drive motors 226A, 226B in turn are each operably coupled to axles, with drive motor 226A being coupled to two axles 228A, 228B and drive motor 226B being coupled to two axles 228C, 228D. The axles 228A, 228B, 228C, 228D are in turn coupled to tractive elements 219A, 219B, 219C, 219D, respectively. The drive pumps 224A, 224B can be mechanically, hydraulic, or electrically coupled to operator input devices to receive actuation signals for controlling the drive pumps.

The arrangement of drive pumps, motors, and axles in loader 200 is but one example of an arrangement of these components. As discussed above, loader 200 is a skid-steer loader and thus tractive elements on each side of the power machine are controlled together via the output of a single hydraulic pump, either through a single drive motor as in loader 200 or with individual drive motors. Various other configurations and combinations of hydraulic drive pumps and motors can be employed as may be advantageous.

The power conversion system 224 of loader 200 also includes a hydraulic implement pump 224C, which is also operably coupled to both the power source 222 and a work actuator circuit 242. Work actuator circuit 242 includes lift cylinders 238 and tilt cylinders 235 as well as control logic to control actuation thereof. The control logic selectively allows, in response to operator inputs, for actuation of the lift cylinders or tilt cylinders. In some machines, the work actuator circuit 242 also includes control logic to selectively provide a pressurized hydraulic fluid to an attached implement. The control logic of loader 200 can include an open center, three-spool valve in a series arrangement. For example, the spools can be arranged to give priority to the lift cylinders, then the tilt cylinders, and then pressurized fluid to an attached implement.

Figure 5:
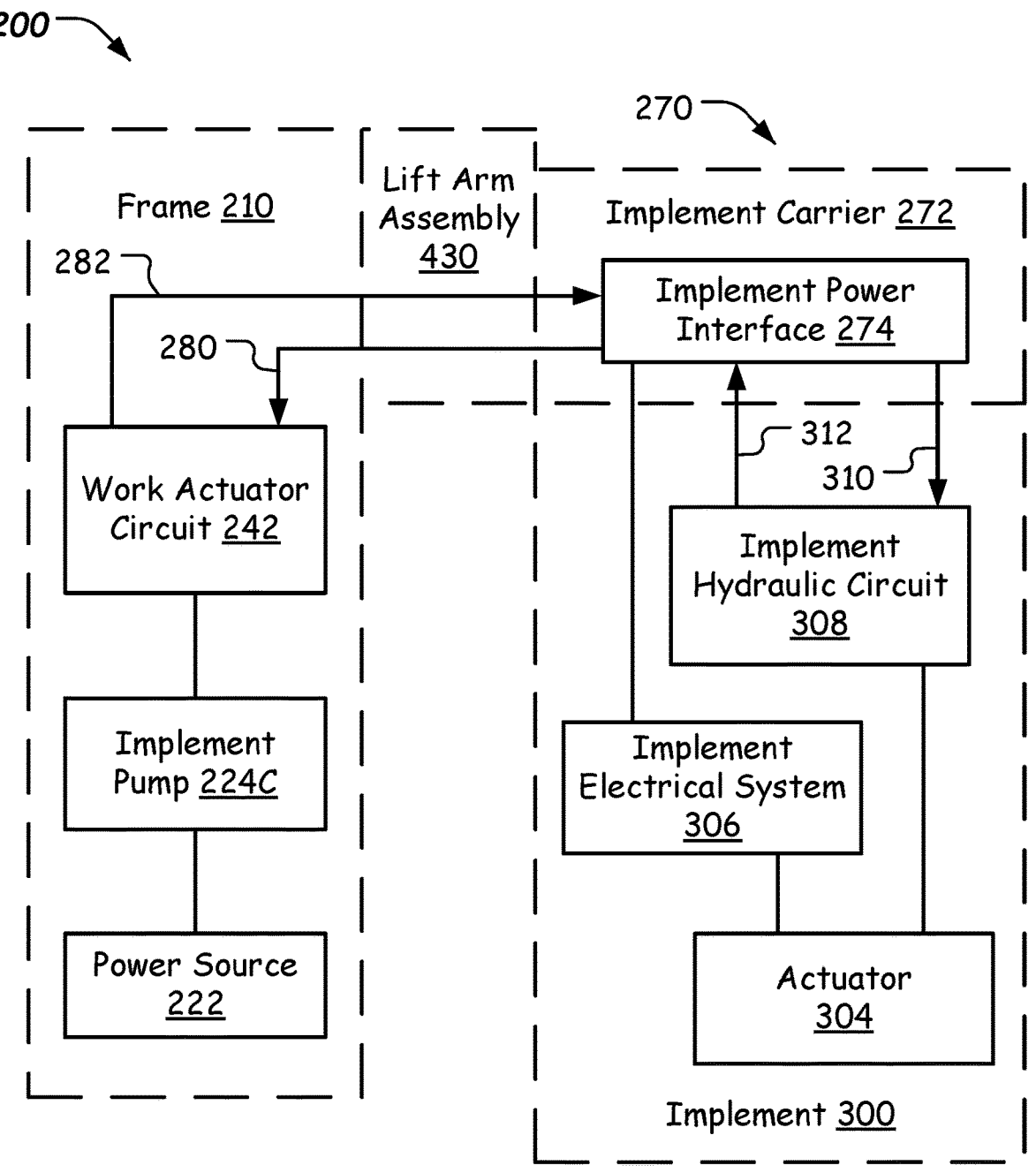
FIG. 5 is a block diagram illustrating example components of a power machine, including the loader illustrated in FIGS. 2-4, having an example implement attached thereto.

As shown in FIG. 5, an example implement 300 that can be operably (e.g., removably) coupled to the loader 200 (e.g., as shown in FIGS. 2-4) can include one or more actuators 304 in electrical communication with one or more implement electrical systems 306 and/or in fluid communication with one or more implement hydraulic circuits 308 of the implement 300. The implement 300 is connected to the implement carrier 272 and is also coupled to implement power interface 274 via conduits 310, 312 (with arrows showing flow to the implement 300 in a first direction and flow from the implement in a second direction). When connected to implement power interface 274, the implement hydraulic circuit 308 is in communication with the work actuator circuit 242 of the power machine 200 via conduits 280, 282 (with arrows showing flow to the implement 300 in the first direction and flow from the implement 300 in the second direction). The work actuator circuit 242 is configured to selectively block flow to the implement 300 or provide pressurized hydraulic flow to the implement 300 in the first direction or the second direction.

The one or more actuators 304 of the implement 300 can include various linear and/or rotary actuators to perform various work functions. In some examples, the one or more actuators 304 of the implement 300 can be configured to be powered exclusively by the implement electrical system 306, exclusively by the implement hydraulic circuit 308, or partially by both. In some examples, the one or more actuators 304 can be operably coupled with an implement member (e.g., a rotary member (not shown)) that is operable when the one or more actuators 304 are powered. In some examples, the implement 300 can include additional components that operably engage the implement member (such as, e.g., a mechanical braking system that can be powered by the implement electrical system 306 and/or the implement hydraulic circuit 308).

The description of power machine 100, loader 200, and implement 300 above is provided for illustrative purposes, to provide illustrative environments on which the examples discussed below can be practiced. While the examples discussed can be practiced on a power machine, such as is generally described by the power machine 100 shown in the block diagram of FIG. 1, and more particularly on a loader, such as track loader 200, unless otherwise noted or recited, the concepts discussed below are not intended to be limited in their application to the environments specifically described above.

Figure 6:
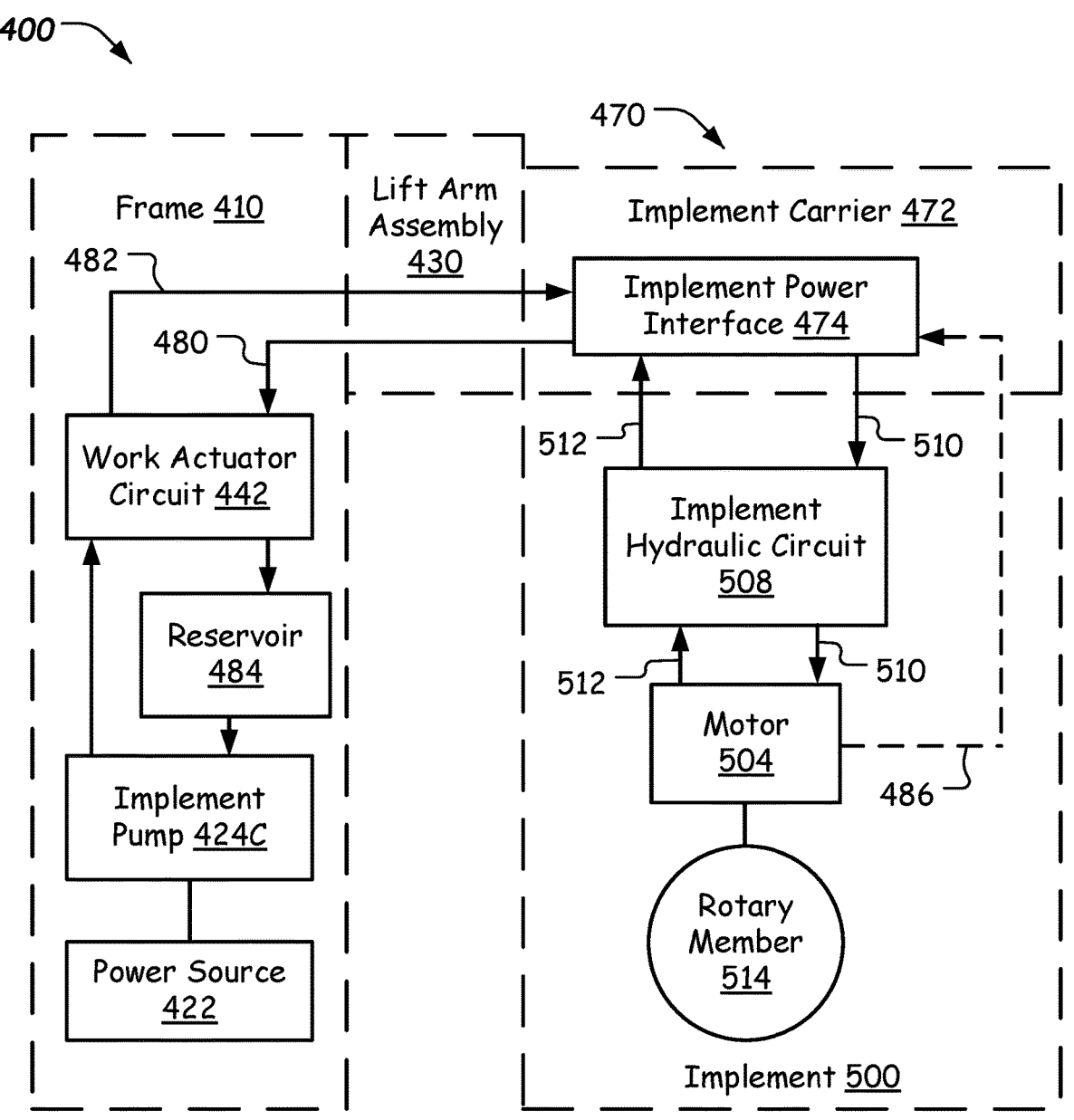
FIG. 6 is a block diagram illustrating example components of a power machine, including the loader illustrated in FIGS. 2-4 and the power machine of FIG. 5, having an example rotary implement attached thereto.

FIG. 6 illustrates an example rotary implement 500 operably (e.g., removably) coupled to a power machine 400 according to examples of the present disclosure. Power machine 400 of FIG. 6 is another particular example of the power machine or loader 200 illustrated broadly in FIGS. 2-5 and discussed above. Likewise, implement 500 of FIG. 6 is another particular example of the implement 300 illustrated broadly in FIG. 5 and discussed above. To that end, features of power machine 400 and implement 500 described below include reference numbers that are generally similar to those used in FIGS. 2-5. For example, power machine 400 is described as having a frame 410, just as loader 200 has the frame 210, and implement 500 is described as having an implement hydraulic circuit 508, just as implement 300 has the implement hydraulic circuit 308. Unless otherwise indicated, discussion above of the loader 200 and the implement 300 also generally applies to the loader 400 and the implement 500.

In some aspects, however, the power machine 400 and implement 500 as shown in FIG. 6 differ from the loader 200 and implement 300 as shown in FIGS. 2-5. In particular, the implement 500 includes a rotary member 514 powered by a hydraulic motor 504, which is a specific example of an actuator as illustrated generally in the example implement 300 operably coupled to the loader 200 in FIG. 5. The rotary member 514 in this example performs a primary function of the implement 500. Accordingly, for the purposes of this discussion, the implement 500 can also be referred to as a rotary implement because it has a rotary actuator (i.e., motor 504) to perform the primary function. One example of a rotary implement is a disc mulcher, which has a large disc with teeth that can cut or mulch trees.

In some examples, the implement 500 is removably coupled to an implement carrier 472 of an implement interface 470 and to implement power interface 474. The implement 500 can thus be moveable relative to the frame 410 of the power machine 400 via movement of a lift arm assembly 430 that includes the implement interface 470. In other examples, however, a rotary implement may not necessarily be supported on a lift arm.

As noted above, the hydraulic motor 504 of rotary implement 500 is configured to cause rotation of the rotary member 514 (e.g., a disc or one or more blades). The motor 504 is powered by the implement hydraulic circuit 508, which is in fluid communication with the motor 504 and, via the implement power interface 474, the work actuator circuit 442 of the power machine 400.

With continued reference to FIG. 6, during operation of the implement 500, an implement pump 424C, powered by a power source 422 of the power machine 400, draws hydraulic fluid from a fluid reservoir 484 and pumps the fluid through the work actuator circuit 442. Based on relevant control inputs, the work actuator circuit 442 can thus selectively provide pressurized hydraulic fluid to the implement power interface 474 in either a first or a second flow direction (e.g., in a direction of arrow 482 as shown, or in a reversed direction). Pressurized hydraulic fluid returned from the implement 500 (e.g., in a direction of arrow 480 as shown, or in a reversed direction) is provided to reservoir 484 and can subsequently be resupplied to the work actuator circuit 442. In some examples, a case drain line 486 is provided, which can limit pressure through the motor 504 by returning hydraulic fluid to the reservoir 484 via the implement hydraulic circuit 508 and implement power interface 474.

Generally, in hydraulic circuits of implements that provide direct connections from one conduit (e.g., conduit 510) to a first side of an actuator (e.g., motor 504) and from another conduit (e.g., conduit 512) to a second side of the actuator, movement of fluid in a first direction will create a single path of hydraulic flow from the power machine to the actuator and from the actuator back to the power machine. In such a case, when the power machine provides pressurized hydraulic fluid in a first direction, the power machine powers movement of the actuator in a first direction. Conversely, when the power machine provides pressurized hydraulic fluid in a second direction, the power machine powers movement of the actuator in a second (reversed) direction. For example, in the case of a rotary actuator (e.g., a hydraulic, bi-directional motor), providing flow in a first direction will cause the motor to turn in a first direction (e.g., clockwise). Conversely, if the power machine provides pressurized hydraulic fluid in the second direction, the motor will turn in a second direction (e.g., counterclockwise).

If the power machine transitions from providing pressurized hydraulic flow in either of the first or second directions to not providing (e.g., entirely blocking) flow to the implement, the motor may continue to turn, corresponding to closed loop hydraulic flow on the implement, but will gradually lose momentum. As further discussed below, one way to slow down a motor of an implement when a power machine stops providing flow to the implement is to create an increased pressure drop in the closed loop flow. This will act to brake the motor, although the increased pressure may also cause the hydraulic fluid to heat rapidly.

In various examples, rotary members (e.g., rotary member 514) that are powered by rotary implements (such as, e.g., implement 500) can have a large mass, or can operate at high rotational speeds so as to require a relatively large amount of energy to be dissipated for a rotary member to come to a rest even after rotation of the rotary member is no longer actively powered (e.g., after the rotary implement moves from an operational mode to a non-operational or standby mode). As discussed above, hydraulic circuits on rotary implements may be configured to operate in a hydraulic braking mode to slow rotation of the rotary member by, for example, providing elevated pressure drop in a closed loop when the power machine is no longer providing hydraulic fluid to the implement.

In some examples, also as further discussed below, selective routing of hydraulic flow between the power machine and an implement hydraulic system (e.g., implement hydraulic circuit 508) during a braking operation can allow the rotary member to be braked relatively rapidly by flow through the implement hydraulic circuit, without excessive build-up of thermal energy in the implement hydraulic circuit or in the implement generally. In some examples, operation in a hydraulic braking mode—with a corresponding braking configuration of an implement hydraulic circuit—can thus substantially reduce the amount of time for a rotary member to stop rotating or otherwise sufficiently slow from a fully energized rotation. This can be accomplished, for example, by simultaneously and continuously removing heated fluid from the implement and replacing it with cooled fluid from the power machine during the braking event (e.g., in combinate ion with an elevated pressure drop in a closed loop (or other) flow for an actuator of the implement (e.g., the motor 504)).

Referring again to FIG. 6, in certain examples, the implement hydraulic circuit 508 (and the power machine 400 generally) is configured to continue to permit flow of hydraulic fluid between the work actuator circuit 442 of the power machine 400 and the motor 504 of the implement 500 during a hydraulic braking mode. Thus, for example, hydraulic fluid that is heated by braking operation of the motor 504 relative to the rotary member 514 can be returned to reservoir 484 or otherwise substantially cooled on the power machine 400 (e.g., passed through a cooler (not shown in FIG. 6) included in the work actuator circuit 442).

As noted generally above, the implement hydraulic circuit 508 can provide braking for the rotary member 514 by permitting continued hydraulic flow through the motor 504 to slow the unpowered but still spinning rotary member 514. As described in further detail below, FIGS. 7A-7C, 8A-8C, and 9A-9D present examples of hydraulic systems of a power machine and a rotary implement (e.g., the power machine 400 and the implement 500), that provide hydraulic braking systems for the rotary implement. The depictions in FIGS. 7A-7C, 8A-8C, and 9A-9D present specific examples of the power machine 400 and the implement 500 and are not intended to be exclusive. Variations can generally include combinations of any of the components and subsystems disclosed herein, including with particular flow components, flow paths, or flow circuits from one example added or substituted into another example according to known principles of hydraulic systems.

Figure 7A:
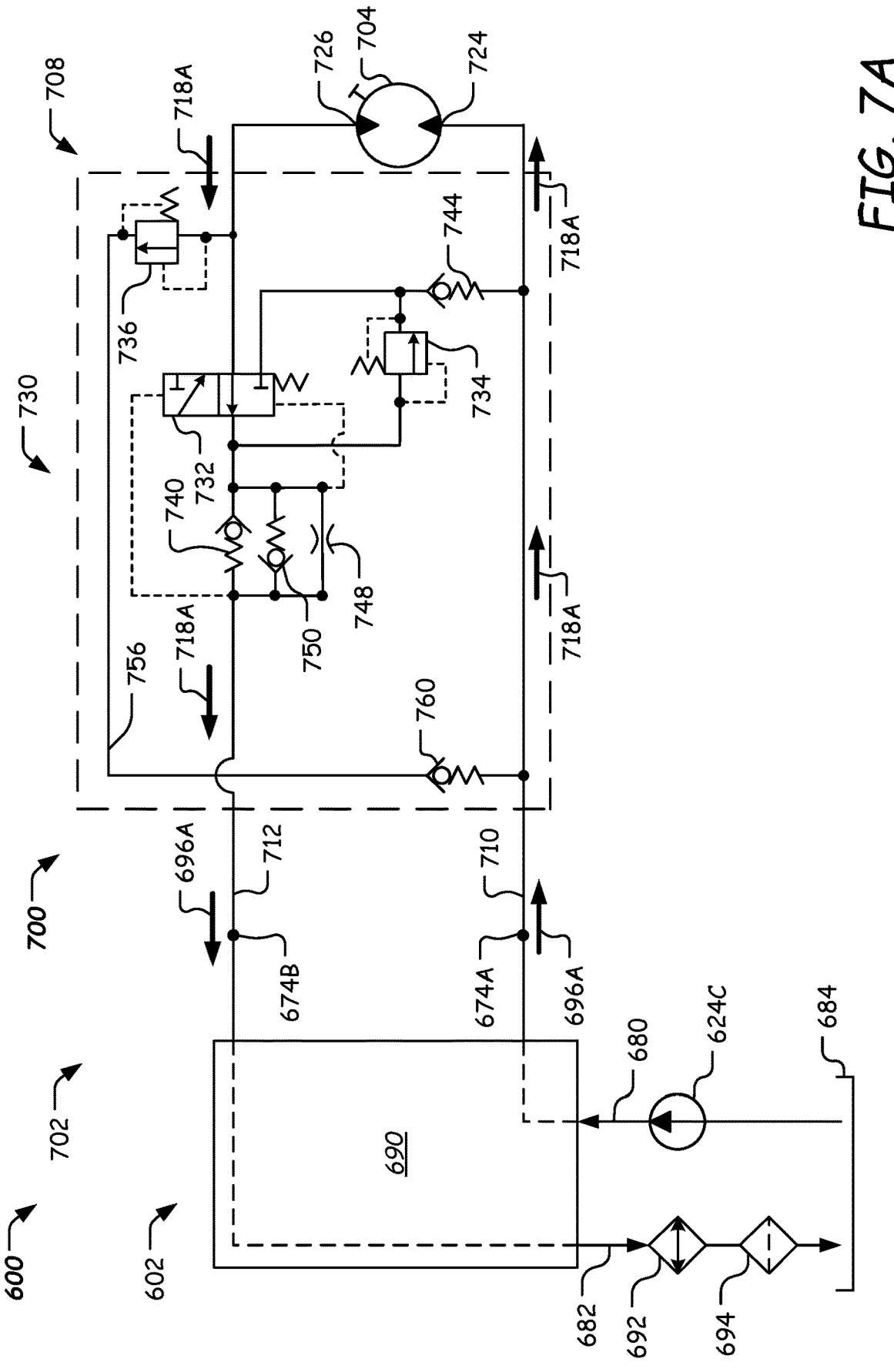
FIGS. 7A-7C are diagrammatic illustrations of an example hydraulic system of a power machine and a rotary implement in various operational configurations according to examples of the present disclosure.
Figure 7B:
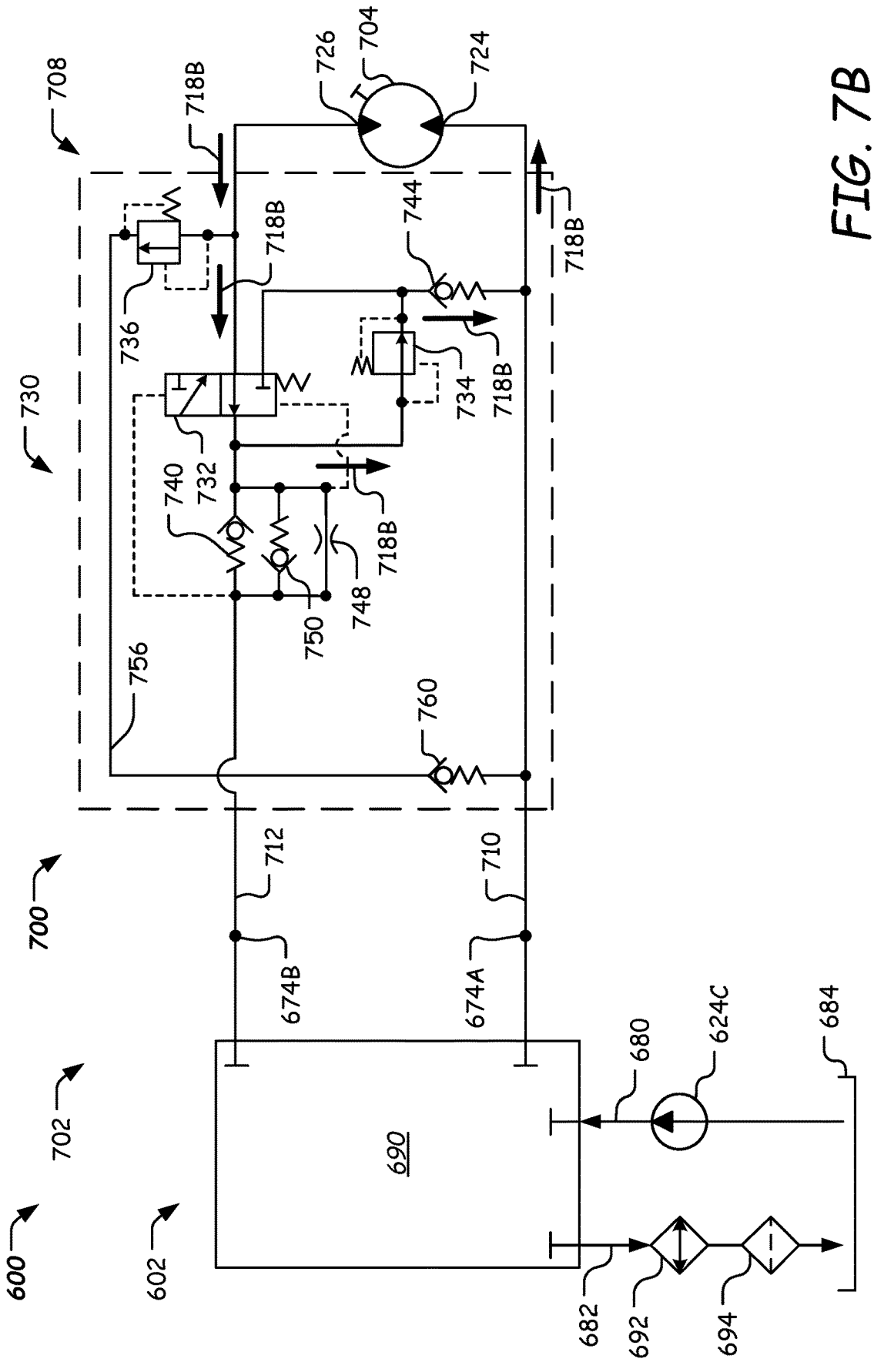
Figure 7C:
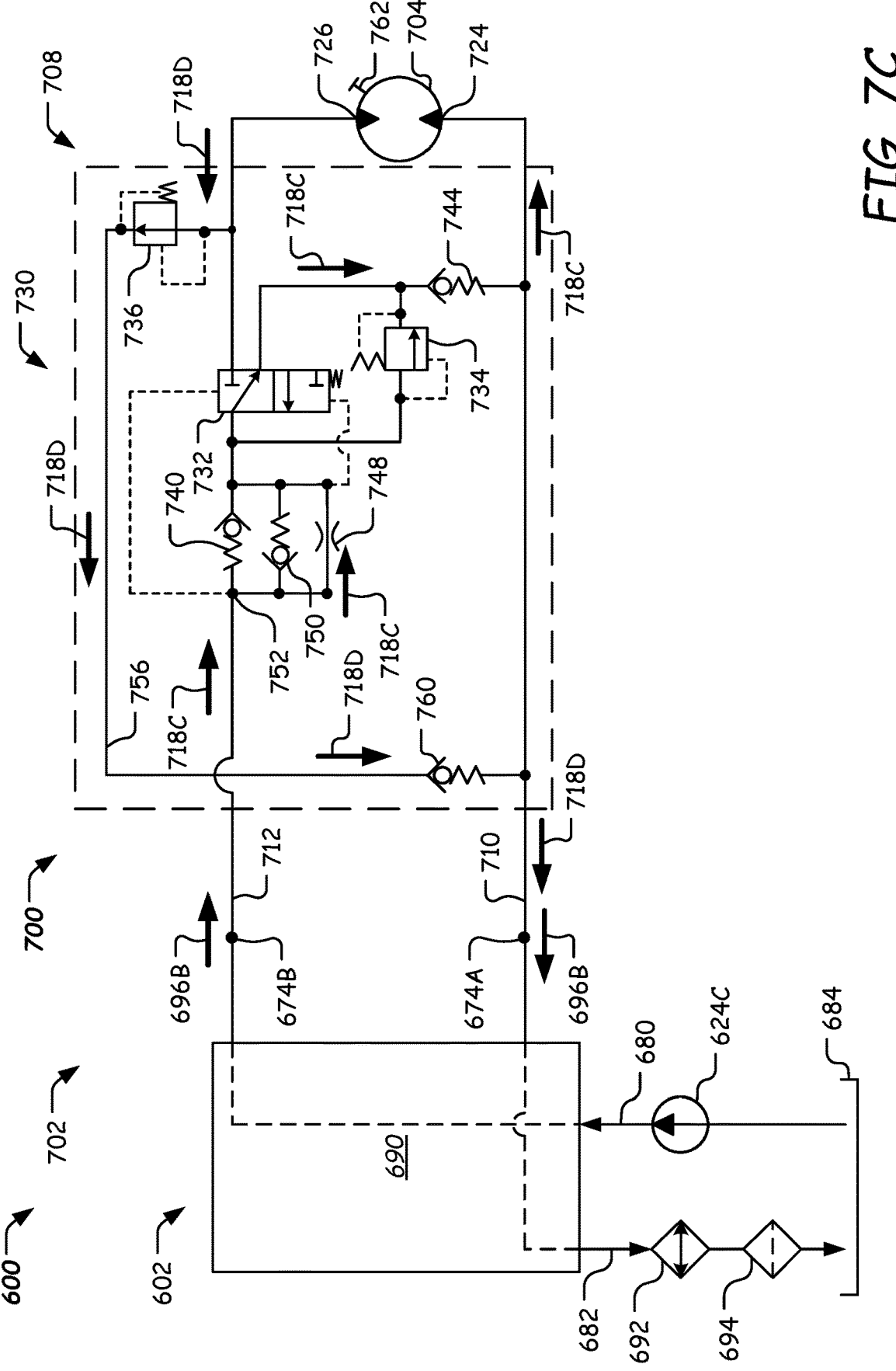

FIGS. 7A-7C illustrate a power machine 600 with an example rotary implement 700 operably coupled thereto that collectively include an example hydraulic system 702 according to some examples of the disclosure. As also noted above the power machine 600 represents an example configuration of the power machines 100, 200, 400 discussed above, and the implement 700 represents an example configuration of the implements 300, 500 discussed above. Thus, discussion of the power machines 100, 200, 400 and implements 300, 500 generally also applies relative to the example of FIGS. 7A-7C.

The hydraulic system 702 operationally includes a combination of a machine hydraulic system 602 and an implement hydraulic circuit 708 with connections between the machine hydraulic system 602 and implement hydraulic circuit 708 being represented by a first node 674A (i.e., a hydraulic interface for flow to a first machine mounted port from a first implement mounted port, or vice versa) and a second node 674B (i.e., a hydraulic interface for flow from a second implement mounted port to a second machine mounted port, or vice versa). Generally, each of the nodes 674A, 674B represents a respective hydraulic interface for flow from a machine mounted hydraulic port to or from an implement mounted hydraulic port (e.g., each including a quick-connect or other hydraulic connector of various know types (not shown)). Generally, such ports are referred to herein as interface ports. In the illustrated example, the hydraulic system 702 is configured to operate in an implement operating mode (shown in FIG. 7A), a first implement braking mode (shown in FIG. 7B), and a second implement braking mode (shown in FIG. 7C), as further detailed below.

The machine hydraulic system 602 of power machine 600 includes a fluid pump 624C powered by a power source (e.g., an engine, electric motor, etc. (not shown in FIGS. 7A-7C)) and in fluid connection with a fluid reservoir 684. The pump 624C, in some examples, is a variable displacement pump that is selectively controlled by an electronic control system (not shown) of the power machine 600. In other examples, the pump 624C is a constant displacement pump and in other examples, the pump 624C can include more than one pump or any pump combination capable of providing a suitable amount of pressurized hydraulic fluid to the implement hydraulic circuit 708, including, in some cases where a portion of the hydraulic flow provided to the implement may bypass a control valve such as the ones described below. One of ordinary skill in the art will understand that various pump configurations can be employed without departing from the scope of this discussion.

The pump 624C is configured to pump fluid drawn from reservoir 684 via conduit 680 to a control valve 690, which in turn is configured to selectively direct flow to the one or more work elements, including to the implement hydraulic circuit 708. For the sake of simplicity, only the implement hydraulic circuit 708 of the implement 700 is shown as being in fluid communication with control valve 690 even though other work elements (e.g., a lift cylinder and a tilt cylinder) may be controlled by control valve 690. In the illustrated example, the control valve 690 is generally configured as a spool valve, and can selectively provide flow into the implement hydraulic circuit 708 in a first direction (e.g., into the circuit 708 at the node 674A and out of the circuit 708 at the node 674B; represented by arrows 696A in FIG. 7A), provide flow into the implement hydraulic circuit 708 in a second direction (e.g., into the circuit 708 at the node 674B and out of the circuit 708 at the node 674A; represented by arrows 696B in FIG. 7C)), or block flow into the implement hydraulic circuit 708 (e.g., with no flow through either of the nodes 674A, 674B (see FIG. 7B)). Fluid returned from the implement hydraulic circuit 708 to the control valve 690 is then returned to reservoir 684 via conduit 682 to a heat exchanger 692 (i.e., fluid cooler), which operates to cool fluid passed therethrough. In some examples, a filter 694 is provided between the heat exchanger 692 and the reservoir 684 to filter out impurities in the fluid before the cooled hydraulic fluid is returned to the reservoir 684. In some examples, a heat exchanger to cool the hydraulic fluid can be otherwise located on the power machine 600.

When the hydraulic system 702 is in the implement operating mode (as shown in FIG. 7A), the implement hydraulic circuit 708 may correspondingly be in an implement operating configuration (as shown in FIG. 7A). With the hydraulic system 702 in the implement operating mode, pressurized hydraulic fluid is provided from the machine hydraulic system 602 in the first direction to the implement hydraulic circuit 708 along conduit 710 (represented by arrows 696A), passes through the implement hydraulic circuit 708 along an operating or driving flow path (represented by arrows 718A), and is returned to the power machine 600 along conduit 712.

The rotary implement 700 includes a hydraulic motor 704 that can be operably engaged with one or more rotary members (not shown) of the implement 700 and configured to cause rotation of the one or more rotary members. In the illustrated example, the motor 704 has a first port 724 (e.g., a motor inlet) in fluid connection with the control valve 690 via the conduit 710 and a second port 726 (e.g., a motor outlet) in fluid connection with the control valve 690 via the conduit 712. In normal operation, the hydraulic motor 704 is configured to be powered via pressurized hydraulic fluid to rotate in only one rotational direction, e.g., with pressurized hydraulic fluid entering at the first port 724 and exiting at the second port 726 to cause the hydraulic motor 704 (and a rotary member coupled therewith) to rotate in a first rotational direction. Thus. as discussed in more detail below, when the hydraulic system 702 is in the implement operating mode (as shown in FIG. 7A), the control valve 690 can provide pressurized fluid via conduit 710 to the first (inlet) port 724 of the motor 704, the motor 704 can accordingly rotate in a first rotational direction, and fluid that passes through the motor 704 can return from the second (outlet) port 726 of the motor 704 to the control valve 690 via the conduit 712. In some examples, motor 704 can be further configured to rotate in a second rotational direction, opposite the first direction, when pressurized hydraulic fluid is provided at the second port 726, to pass through motor 704 to the first port 728. Further, other flow paths to or from the ports 724, 726 are also possible, including as also further discussed below.

In the illustrated example, the implement hydraulic circuit 708 further includes a hydraulic braking circuit 730 (indicated by a dashed box in each of FIGS. 7A-7C) to slow rotation of motor 704 (e.g., when an operator commands motor 704 to be stopped, corresponding to the operator no longer commanding operation of implement 700). In the illustrated example, the braking circuit 730 can include a first braking valve 736 and a second braking valve 734. The braking circuit 730 can also include a bypass control valve 732 that is configured to selectively route flow across (or bypass) the first braking valve 736 in certain operating conditions of the implement 700.

As shown in FIG. 7A, with the implement hydraulic circuit 708 in the implement operating configuration, both braking valves 734, 736 are biased to a first or blocked position and the bypass control valve 732 is biased to a first or operating-configuration position in which flow is permitted along conduit 712. With the hydraulic system 702 in the implement operating mode (as shown in FIG. 7A), and correspondingly with the implement hydraulic circuit 708 in the implement operating configuration, pressurized fluid flowing in the first direction 696A (i.e., a driving hydraulic flow) enters the implement hydraulic circuit 708 via the node 674A, flows along conduit 710 to pass through and drive the motor 704 (i.e., into motor port 724 and then out of motor port 726), and then flows through bypass control valve 732 to continue along conduit 712.

Once the pressurized fluid flows from the motor port 726 and through the bypass control valve 732, the fluid flows through a check valve 740, out of the implement hydraulic circuit 708 via the node 674B, then back to control valve 690 and the reservoir 684 of the machine hydraulic system 602. In some cases, one or both braking valves 734, 736 can have a biasing mechanism that requires a pressure that is higher than a pressure that is provided when fluid is returned to control valve 690. Thus, in such cases, one or both of the braking valves 734, 736 can remain closed in the blocked position during normal operation of the implement 700.

In response to an operator command to cease operation of the implement 700 (e.g., from the implement operating mode, as shown in FIG. 7A), the hydraulic system 702 can be configured to shift to the first implement braking mode (as shown in FIG. 7B) with the implement hydraulic circuit 708 in a first braking configuration (as also shown in FIG. 7B). In some cases, the hydraulic system 702 can be configured to shift from the implement operating mode to the first implement braking mode in response to an operator command to initially cease operation of the implement 700 (i.e., a first operator braking command). In some such cases, the first operator braking command may correspond simply to a return of the control valve 690 to a default or rest position (e.g., with a main spool of the control valve 690 centered).

With the hydraulic system 702 in the first implement braking mode, the control valve 690 causes the machine hydraulic system 602 to cease the provision of hydraulic fluid to the implement hydraulic circuit 708. As noted above, when flow of pressurized hydraulic fluid is no longer provided from the machine hydraulic system 602 to motor 704 for powered operation, motor 704 may still need to dissipate energy to slow (or stop) rotation of the rotary member (not shown) coupled thereto (e.g., particularly if the rotary member has a high moment of inertia, if the motor 704 is configured to rotate at a high rotational speed, or both). In the illustrated example, fluid passing through the motor 704 increases pressure at the port 726 of the motor 704, because such fluid cannot return to the control valve 690, which is blocking flow, or to the machine hydraulic system 602 generally. This buildup of pressure at the port 726 can eventually cause the second braking valve 734 to shift (as shown in FIG. 7B) to allow flow therethrough and thereby provide a first braking or bypass flow path 718B through check valve 744 back to the motor 704.

Because of the pressure loss along the first braking flow path 718B, and across the braking valve 734 in particular, rotation of the motor 704 can thus be gradually reduced. However, increased pressure in the implement hydraulic circuit 708 can also cause an increase in temperature of hydraulic fluid in the implement hydraulic circuit 708. In some cases, such increases in temperature of hydraulic fluid in implement hydraulic circuit 708 can result in damage to the motor 704 and other hydraulic components as well as a reduction in the effective life of the heated hydraulic fluid. Therefore, in some such cases, it may be desirable to ensure that the second braking valve 734 is configured to not have too high of a pressure setting, which can correspondingly result in a relatively long braking time.

As shown in FIGS. 7A-7C, an orifice 748 can be included in the implement hydraulic circuit 708 to equalize pressure on either side of the check valves 740, 750. Generally, as presented herein, such orifice or additional orifices may be included in some examples (or not), depending on the needs of a particular configuration of an implement hydraulic circuit. Similarly, the various check valves of an implement hydraulic circuit discussed herein (e.g., check valves 740, 750 of implement hydraulic circuit 708) can be included in some examples (or not), depending on the needs of a particular configuration of an implement hydraulic circuit and may in some cases be configured as other types of one-way valves.

In order to provide a shorter braking time as compared to the first implement braking mode (as shown in FIG. 7B), the hydraulic system 702 can be configured to alternately (or subsequently) operate in the second braking mode (as shown in FIG. 7C), with the implement hydraulic circuit 708 correspondingly in a second braking configuration (as also shown in FIG. 7C). More specifically, with the hydraulic system 702 in the second implement braking mode, the control valve 690 is controlled to provide pressurized hydraulic fluid in the second direction (as indicated by arrows 696B in FIG. 7C) to the implement hydraulic circuit 708 (e.g., at node 674B). For example, a spool of the control valve 690 can be commanded (e.g., electronically or fluidically) to move to a reversed flow position, as opposed to a center position (corresponding to FIG. 7B) or a forward flow position (corresponding to FIG. 7A). In some cases, the hydraulic system 702 can be configured to shift from the implement operating mode to the second implement braking mode in response to the first operator braking command. In other cases, the hydraulic system 702 can be configured to shift from the implement operating mode to the first implement braking mode in response to the first operator braking command and then to shift from the first implement braking mode to the second implement braking mode in response to a subsequent operator command to more quickly brake the implement 700 (i.e., a second operator braking command).

With the implement hydraulic circuit 708 the second braking configuration (as shown in FIG. 7C), the hydraulic braking circuit 730 is configured to provide a second braking flow path (as indicated by arrows 718C in FIG. 7C) to permit flow of fluid received in the second direction 696B across the node 674B to flow to the motor port 724. Further, in the second braking configuration, the braking circuit 730 can simultaneously also provide a return flow path (as indicated by arrows 718D in FIG. 7C) for return flow of fluid from the motor port 726 via the node 674A to the control valve 690 (and to the machine hydraulic system 602 generally). As will be discussed below, a braking flow of fluid along the second braking flow path 718C and the return flow path 718D can provide higher braking pressures to more quickly slow the motor 704 (e.g., relative to the first braking mode). Additionally, the braking flow in the second braking mode returns heated fluid to the power machine 600 for cooling and providing a fresh supply of cooled fluid to the implement 700 from the power machine 600, to help prevent overheating of fluid within the implement hydraulic circuit 708.

In some examples, the control valve 690 can be controllable by an operator of the power machine 600 to cause the control valve 690 to provide hydraulic fluid to the implement 700 in one of the first or second directions. For example, as generally noted above, an operator selectively may provide a first command for the control valve 690, to operate the motor 704 with flow from the pump 624C in the first direction 696A (see FIG. 7A), a second (e.g., rest or null) command for the control valve 690, to cause the motor 704 to be braked by a closed loop flow on the implement 700 (see FIG. 7B), and a third command for the control valve 690, to cause the motor 704 to be braked by a flow from the pump 624C in the second direction 696B (see FIG. 7C).

In the example shown in FIG. 7C, fluid provided in the second direction 696B from control valve 690 passes through check valve 750 and provides suitable pressure at node 752 to shift bypass control valve 732 into the position shown in FIG. 7C. The shifted bypass control valve 732 blocks flow returning from the motor port 726 through the bypass control valve 732, causing pressure buildup that shifts the braking valve 736, allowing flow to return to the control valve 690 following the return path 718D along conduit 756 and through check valve 760. Simultaneously, fluid is provided to the motor 704 following the second braking path 718C through bypass control valve 732 and check valve 744 to the motor port 724 at a higher pressure (which is set by valve 736). The result is a higher braking pressure, allowing the motor 704 to slow more quickly and, with the continuous introduction of fluid from the machine 600 via the second braking path 718C, preventing overly rapid heating of fluid in the implement hydraulic circuit 708.

In some examples, to provide sufficient fluid flow to motor 704 (e.g., to prevent cavitation within the motor 704) in the second implement braking mode (as shown in FIG. 7C), a portion of the fluid that flows from the second port 726 of motor 704 along the return path 718D may be recirculated to the motor port 724 (e.g., along conduit 710). This partial recirculation can, for example, continue until the motor 704 reaches a sufficiently low rotational speed and thus requires a sufficiently low fluid flow such as can be provided along the second braking path 718C alone. Thus, for example, during operation in the braking configuration illustrated in FIG. 7C, the implement hydraulic circuit 708 may divide flow from the braking valve 736 between the motor 704 and the machine hydraulic system 602.

Figure 7D:
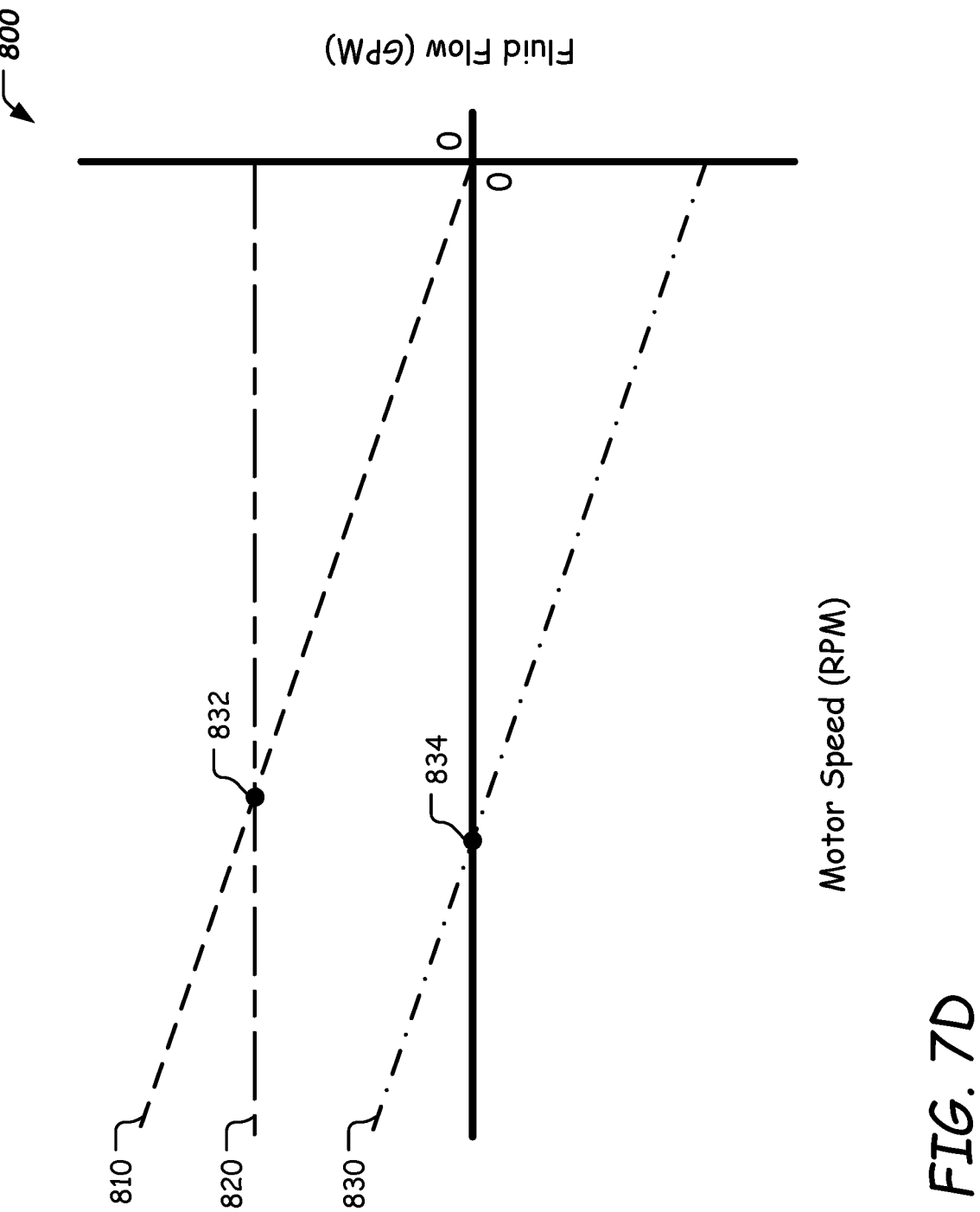
FIG. 7D is a diagram illustrating a relationship between fluid flow within an implement hydraulic circuit and a rotational speed of a rotary actuator of the rotary implement of FIGS. 7A-7C.

In this regard, FIG. 7D illustrates a graph 800 showing a relationship between fluid flow through the implement hydraulic circuit 708 in gallons per minute (GPM) and a rotational speed of the motor 704 in revolutions per minute (RPM) for operation of the implement hydraulic circuit 708 in the second braking configuration shown in FIG. 7C. In graph 800 of FIG. 7D, line 810 corresponds to flow required by motor 704 after the hydraulic system 702 shifts to the second implement braking mode (as shown in FIG. 7C). Line 820 corresponds to flow supplied to the motor port 724 along second braking path 718C. Line 830 corresponds to supplemental or makeup flow along the return path 718D that is recirculated to the motor port 724 with flow along the second braking path 718C.

As shown in graph 800, during the initial shift from the first implement braking mode (as shown in FIG. 7B) to the second implement braking mode (as shown in FIG. 7C), the relatively high speed of motor 704 (see line 810) requires more fluid flow than can be provided along the second braking path 718C alone (see line 820). Thus some flow along the return path 718D is recirculated to motor 704 (see line 830). Once the speed of motor 704 is reduced to a point at which flow along the second braking path 718C alone is sufficient (i.e., as indicated at point 832 in graph 800), full flow along the return path 718D can be routed back to reservoir 684 of power machine 600 (i.e., as indicated at point 834 in graph 800).

Referring again to FIGS. 7A-7C, in some applications, check valve 750 of implement hydraulic circuit 708 may be optional. For example, in some cases, flow into the implement hydraulic circuit 708 along conduit 712 in the second direction 696B (see FIG. 7C), the particular configuration of the bypass control valve 732, or the particular configuration of the motor 704 may be such that pressure at node 752 is sufficient to shift the bypass control valve 732 into the position shown in FIG. 7C without an increase in pressure at node 752 that would otherwise be provided by check valve 750. This alternative configuration may thus still prevent overheating of fluid within the implement hydraulic circuit 708 while maintaining a relatively higher braking pressure. In some examples, the hydraulic system 702 may include a case drain line (not shown) in fluid communication with a third port 762 (see FIG. 7C) of the motor 704 of the implement hydraulic circuit 708 and extending to the reservoir 684 of the machine hydraulic system 602, which can be arranged to relieve excess pressure between the motor port 724 and the motor port 726.

Figure 8A:
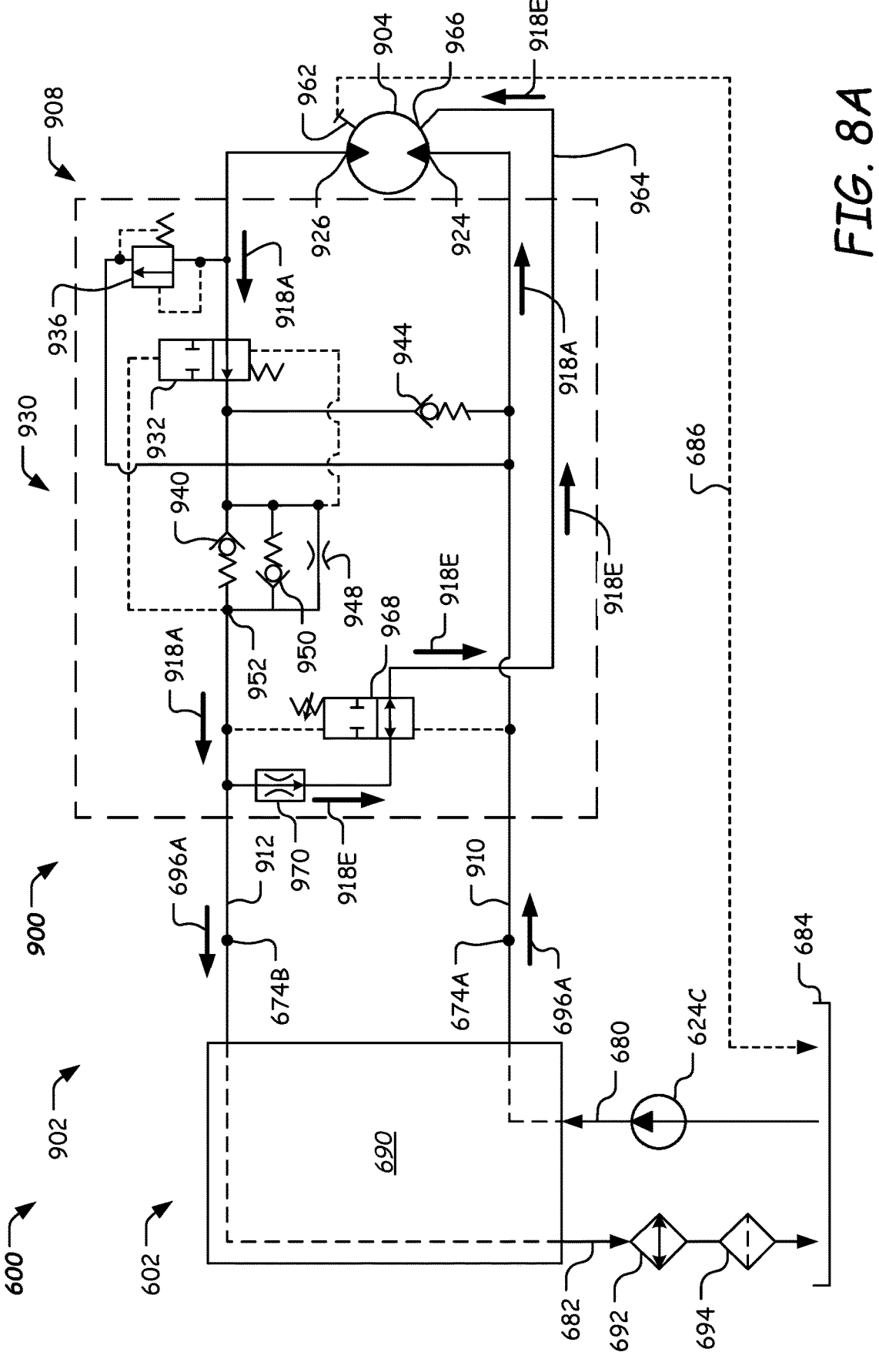
FIGS. 8A-8C are diagrammatic illustrations of another example hydraulic system of a power machine and a rotary implement in various operational configurations according to examples of the present disclosure.
Figure 8B:
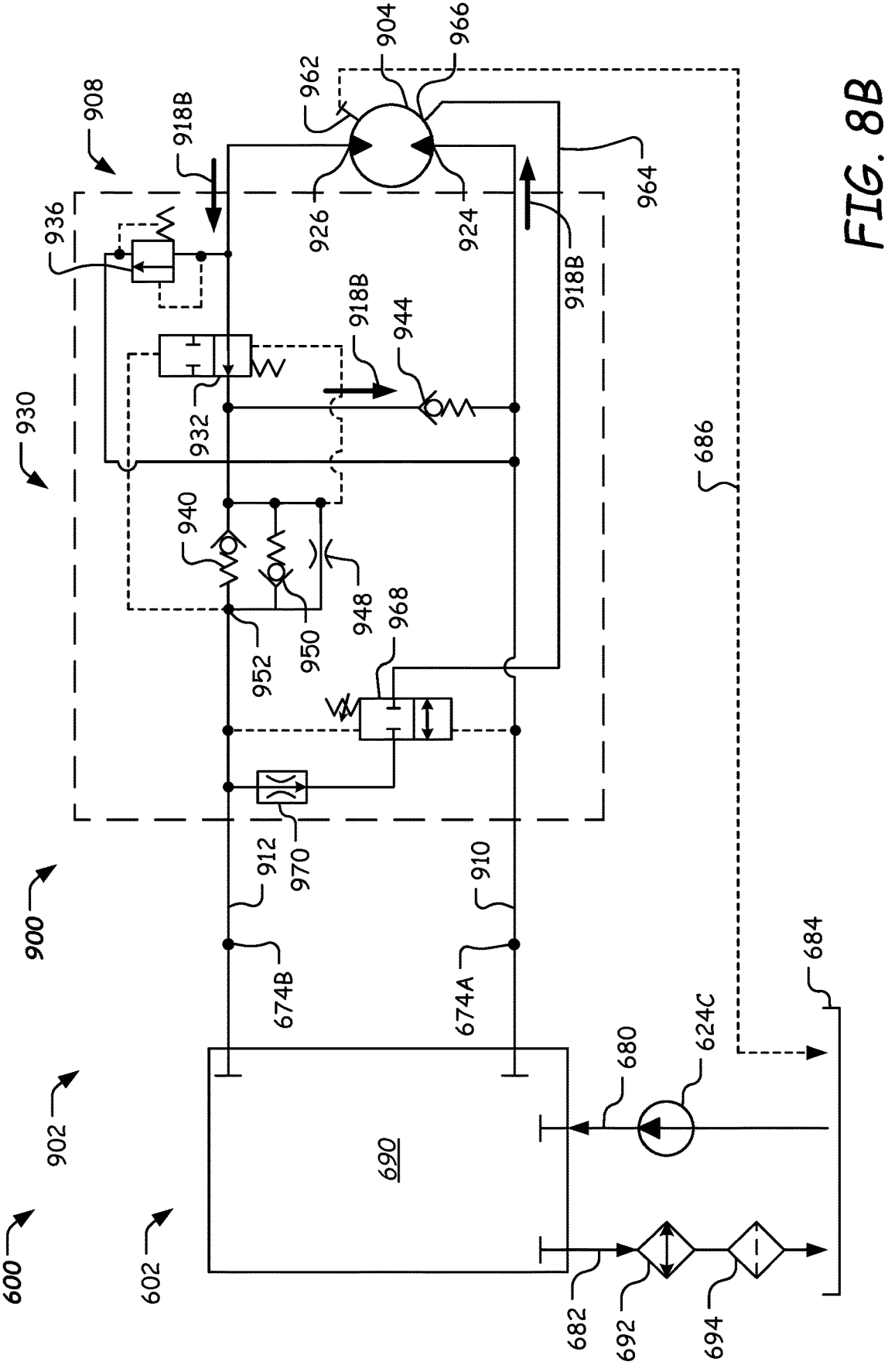
Figure 8C:
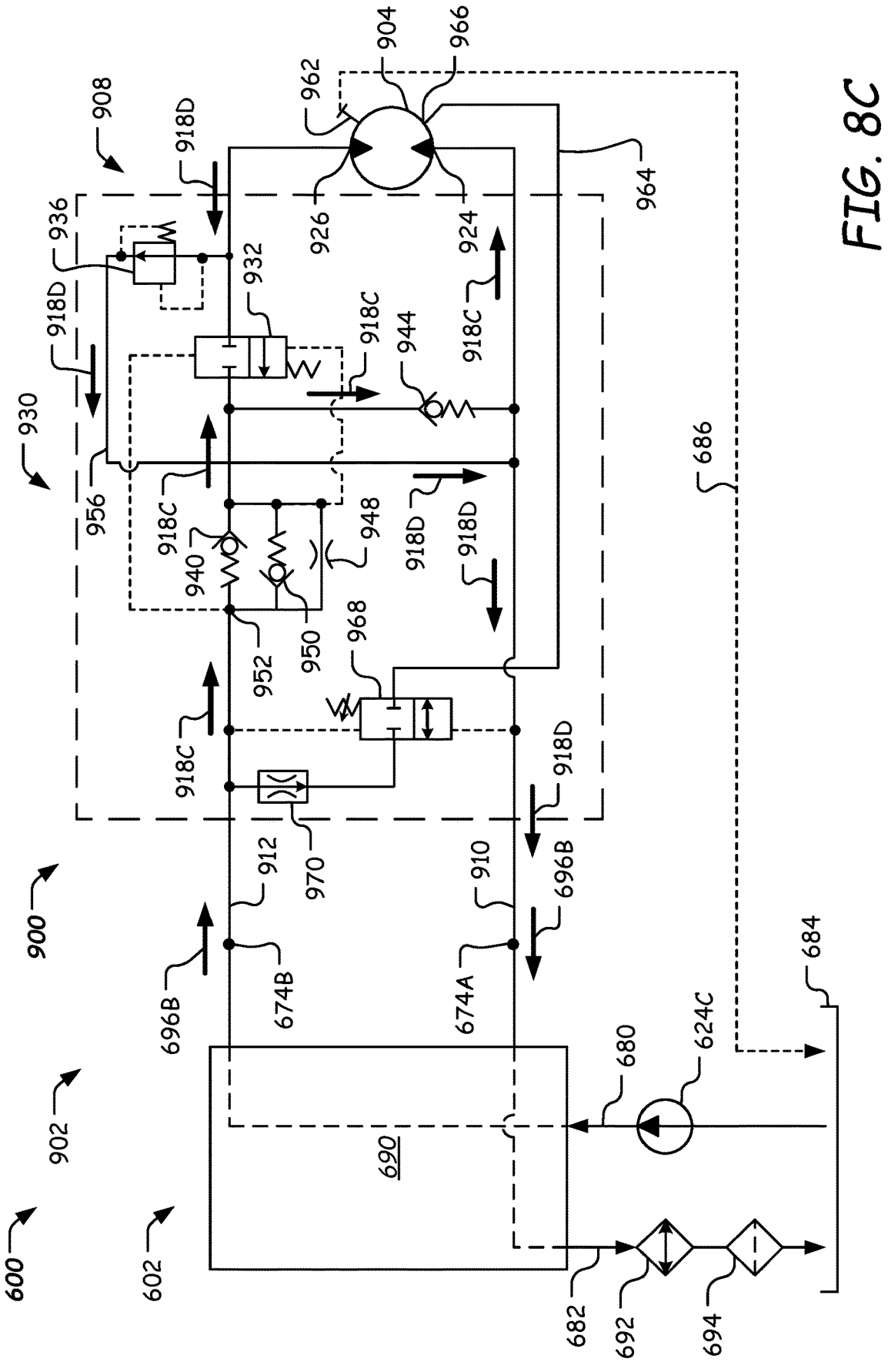

It should be appreciated that other configurations of an implement hydraulic circuit of an implement may provide the benefits discussed above along with additional cooling during operation of the implement. In this regard, FIGS. 8A-8C illustrate another example rotary implement 900 that is operably coupled to the power machine 600 to collectively form another example hydraulic system 902 according to some examples of the disclosure. The implement 900 of FIGS. 8A-8C is another particular example of the implements 300, 500, 700 illustrated in FIGS. 5, 6, and 7A-7C, respectively, and the hydraulic system 902 is another particular example of the hydraulic system 702 illustrated in FIGS. 7A-7C. To that end, features of implement 900 and hydraulic system 902 described below include reference numbers that are generally similar to those used in FIGS. 5-7C. For example, implement 900 is described as having an implement hydraulic circuit 908, just as implements 300, 500 have the implement hydraulic circuits 308, 508. Correspondingly, discussion above of the power machines 100, 200, 400 and the implements 300, 500, 700 generally also applies relative to the example of FIGS. 8A-8C.

Like the hydraulic system 702, the hydraulic system 902 operationally includes a combination of the machine hydraulic system 602 of power machine 600 and the implement hydraulic circuit 908 of implement 900, with connections between the machine hydraulic system 602 and the implement hydraulic circuit 908 being represented by nodes 674A, 674B. Further, implement hydraulic circuit 908 includes conduits 910, 912, a bypass control valve 932, a braking valve 936, check valves 940, 944, 950, and an orifice 948, which are configured similar to the conduits 710, 712, the bypass control valve 732, the first braking valve 736, the check valve 740, 744, 750, and the orifice 748 of implement hydraulic circuit 708 in FIGS. 7A-7C. Moreover, in the illustrated example, the implement hydraulic circuit 908 includes a hydraulic braking circuit 930 (indicated by a dashed box in FIGS. 8A-8C) such that the hydraulic system 902 is configured to operate in an implement operating mode (shown in FIG. 8A), a first implement braking mode (shown in FIG. 8B), and a second implement braking mode (shown in FIG. 8C).

In some aspects, however, the implement 900 shown in FIGS. 8A-8C differs from the implement 700 shown in FIGS. 7A-7C. In particular, the implement hydraulic circuit 908 of the implement 900 is configured to provide additional cooling to a hydraulic motor 904 of the implement hydraulic circuit 908 while the hydraulic system 902 operates in the implement operating mode (shown in FIG. 8A). Such additional cooling provided to the motor 904 by the implement hydraulic circuit 908 may reduce heat transfer to hydraulic fluid during operation of the implement 900 in addition to the heat exchanger 692 of the machine hydraulic system 602. More specifically, the implement hydraulic circuit 908 further includes a flushing conduit 964 in communication with the conduit 912 downstream of the bypass control valve 932 (relative to flow from a motor (outlet) port 926 to the node 674B) and also in communication with a flushing port 966 of the motor 904. A flushing valve 968 and a pressure compensated flow regulating valve 970 are arranged along the flushing conduit 964 (e.g., each of generally known types).

Referring specifically to FIG. 8A, with the hydraulic system 902 operating in the implement operating mode, pressurized fluid is provided from the control valve 690 in the first direction 696A to the implement hydraulic circuit 908, passes through the motor 904 via a motor (inlet) port 924 and the motor port 926 (in series), and returns to the control valve 690 along an operating or driving flow path as represented by arrows 918A. Pressurized flow along conduit 910, and in particular elevated pressure along the conduit 910 as compared to the conduit 912, causes the flushing valve 968 to shift as shown in FIG. 8. As a result, the flushing valve 968 can permit a portion of flow along conduit 912 to be diverted to flow through the flow regulating valve 970 and the flushing valve 968 and along the flushing conduit 964 to the flushing port 966 of motor 904 along a flushing flow path (i.e., a second path) as represented by arrows 918E. Thus, a portion of the flow along the conduit 912 can be diverted to further cool the motor 904. A portion of the fluid provided to the flushing port 966 of the motor 904 along the flushing flow path 918E may flow out of the motor port 926 and through the heat exchanger 692 back to the reservoir 684 along the operating flow path 918A, while another portion may flow out of a third port 962 (i.e., motor drain) of the motor 904 and directly back to reservoir 684 along the case drain line 686.

Once the hydraulic system 902 shifts from the implement operating mode (shown in FIG. 8A) to the first implement braking mode (shown in FIG. 8B), the control valve 690 ceases flow of pressurized fluid to the implement hydraulic circuit 908. As a result, a pressure difference between the conduits 910, 912 is reduced, which causes the flushing valve 968 to shift and block flow along the flushing conduit 964. Further, continued low pressure along the conduit 912 also allows the bypass control valve 932 to remain in the operational configuration (see also FIG. 8A). Accordingly, a recirculating flow of hydraulic fluid on the implement 900 can circulate through the motor 904 along a first braking path as represented by arrows 918B (and as similarly discussed relative to FIG. 7B).

When the hydraulic system 902 shifts from the first implement braking mode (shown in FIG. 8B) to the second implement braking mode (shown in FIG. 8C), pressurized fluid is provided from the control valve 690 to the implement hydraulic circuit 908 in the second direction 696B, which causes the flushing valve 968 to correspondingly remain in the blocked position. Further, fluid provided in the second direction 696A provides suitable pressure at node 952, upstream of the check valve 950, to shift the bypass control valve 932 into a blocking position (as shown). The shifted bypass control valve 932 thus blocks flow returning from the motor port 926 from passing through bypass control valve 932, causing pressure buildup that shifts the braking valve 936 to open and thereby allows flow to return to the control valve 690 via a return flow path 918D along conduit 956 to conduit 910. Simultaneously, and also as a result of the blocked configuration of the bypass control valve 932, fluid from the machine hydraulic system 602 is provided to the motor 904 following a second braking path 918C to conduit 910, and thus to the motor 904 at the motor port 924.

In the braking mode as illustrated in FIG. 8C, as similarly discussed above relative to FIG. 7C, flow of hydraulic fluid along the return flow path 918D can be divided in some cases between a return flow to the machine hydraulic system 602 (and the cooler 692) and a supplemental flow to the motor 904. Thus, for example, depending on the rotational speed of the motor 904 and the flow rate of hydraulic fluid along the braking flow path 918C, supplemental flow from the return path 918D can be automatically diverted to the motor 904 to help prevent cavitation. In this regard, the flow and motor speed relationships illustrated in FIG. 7D also generally apply to operation of the hydraulic system 902.

Figure 9A:
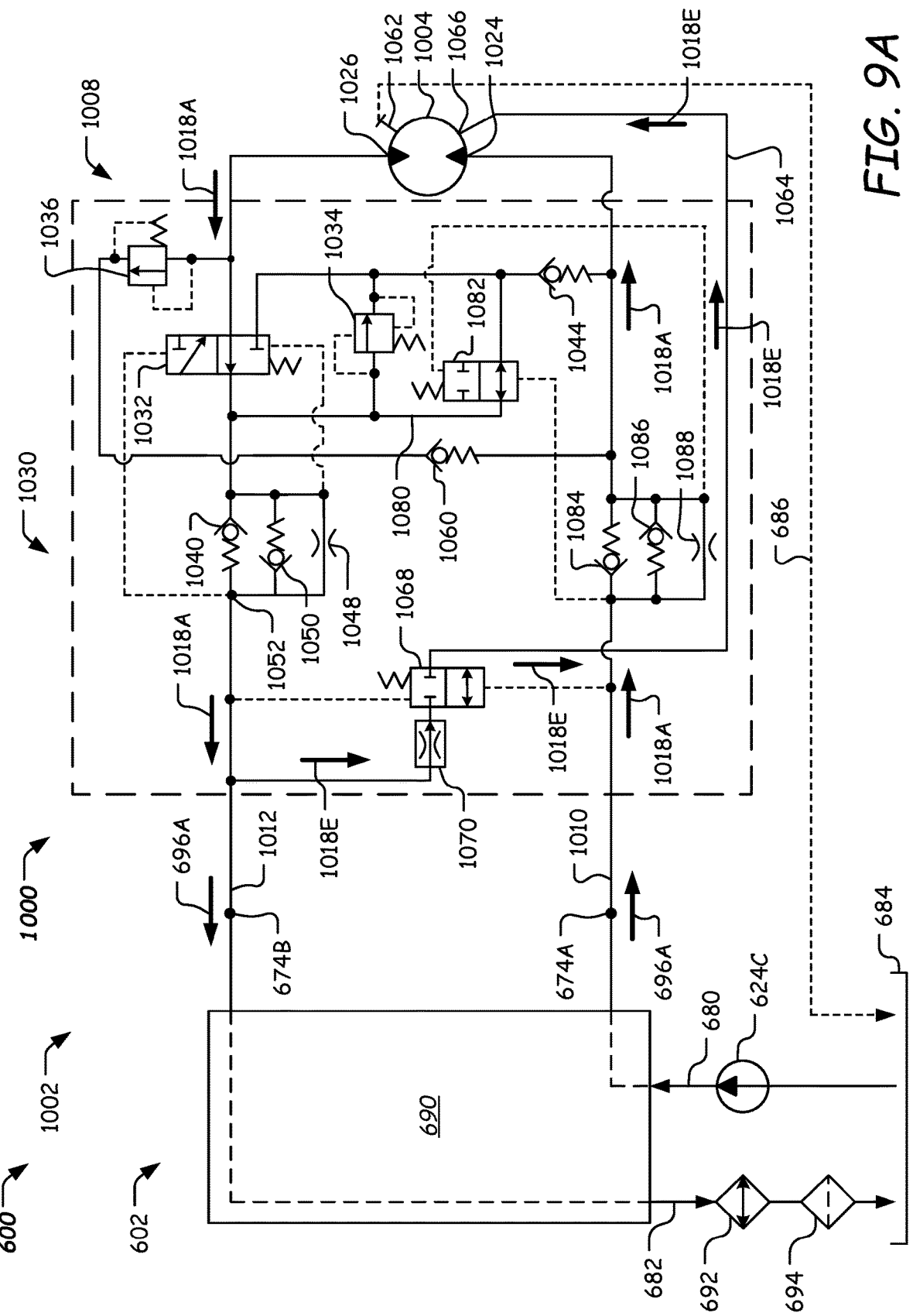
FIGS. 9A-9D are diagrammatic illustrations of yet another example hydraulic system of a power machine and a rotary implement in various operational conditions according to examples of the present disclosure.
Figure 9B:
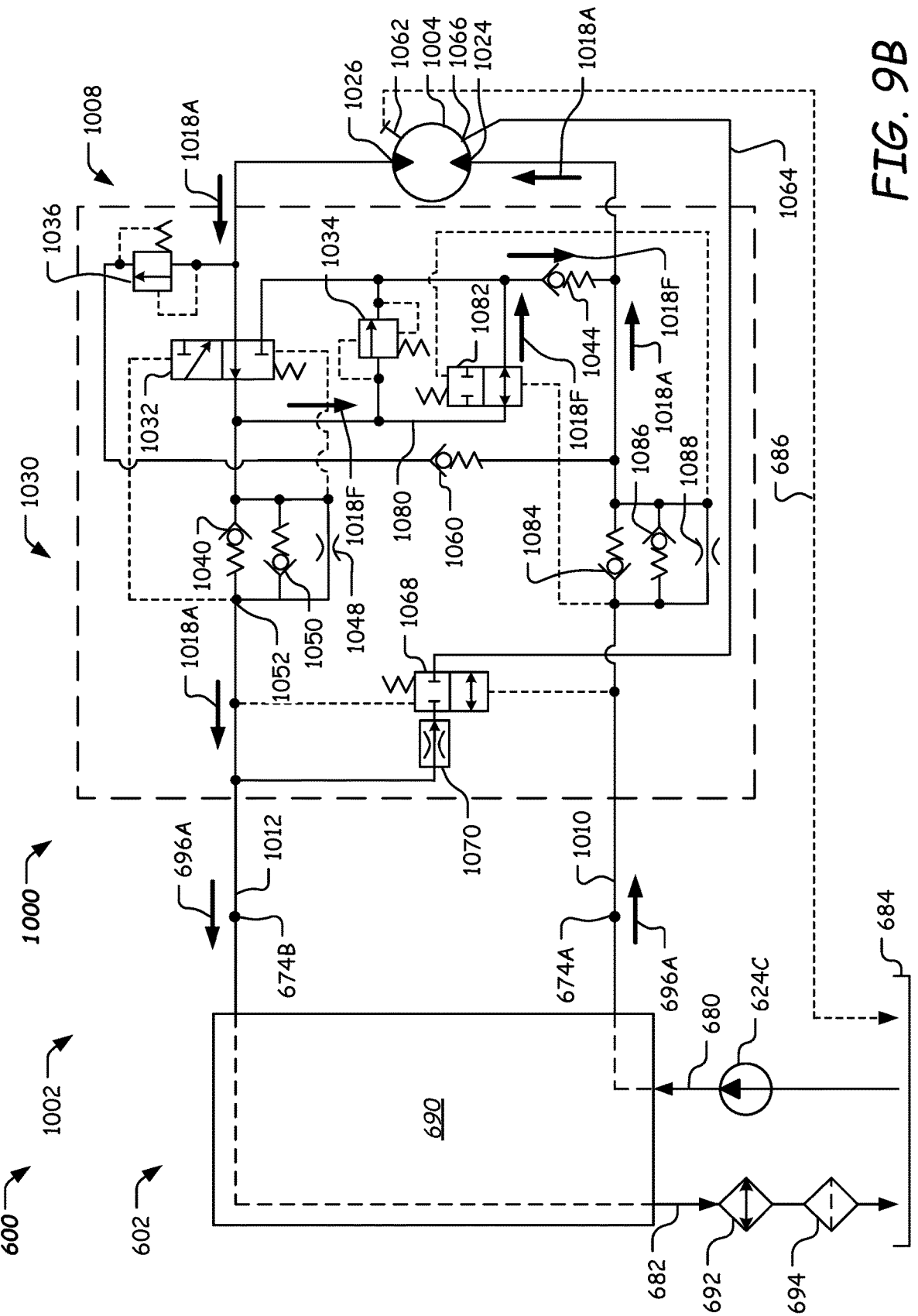
Figure 9C:
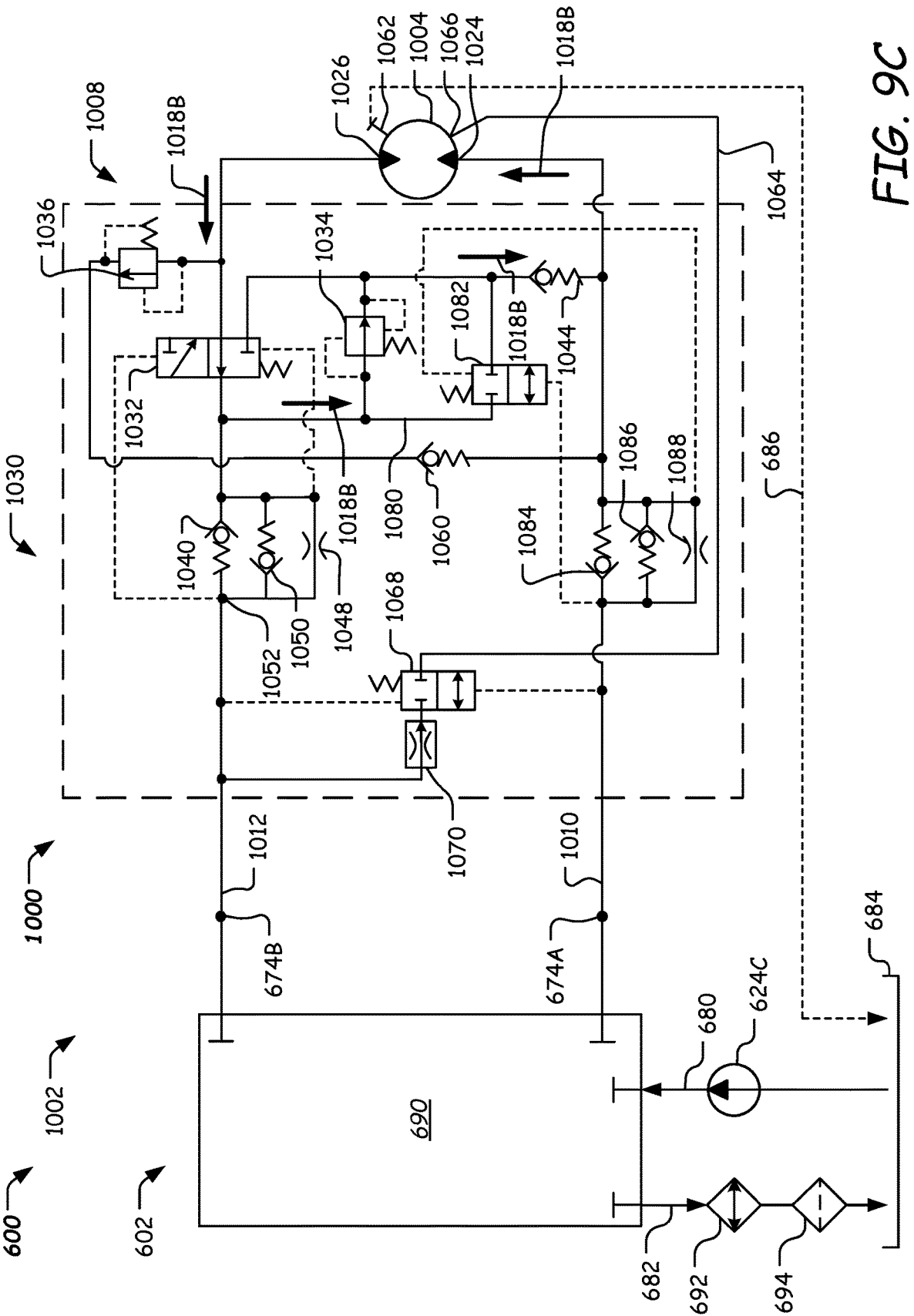

It should be appreciated that other configurations of an implement hydraulic circuit of an implement may provide the benefits discussed above along with additional components to reduce or prevent cavitation of a hydraulic motor during operation of the implement (e.g., during a change between high- and low-speed operation of a power source or during multi-function implement operating modes). In this regard, FIGS. 9A-9C illustrate another example implement 1000 that is operably coupled to the power machine 600 to collectively form another example hydraulic system 1002, according to some examples of the disclosure. The implement 1000 of FIGS. 9A-9D is another particular example of the implements 300, 500, 700, 900 illustrated in FIGS. 5, 6, 7A-7C, and 8A-8C, respectively, and the hydraulic system 1002 is another particular example of the hydraulic systems 702, 902 illustrated in FIGS. 7A-7C and 8A-8C, respectively. To that end, features of implement 1000 and hydraulic system 1002 described below include reference numbers that are generally similar to those used in FIGS. 5, 6, 7A-7C, and 8A-8C. For example, implement 1000 is described as having an implement hydraulic circuit 1008, just as implements 300, 500, 700, 900 have the implement hydraulic circuits 308, 508, 708, 908. Correspondingly, discussion above of the power machines 100, 200, 400 and the implements 300, 500, 700, 900 generally also applies relative to the example of FIGS. 9A-9D.

Like hydraulic systems 702, 902, hydraulic system 1002 operationally includes a combination of the machine hydraulic system 602 of power machine 600 and the implement hydraulic system 1008 of implement 1000, with connections between the machine hydraulic system 602 and the implement hydraulic system 1008 being represented by nodes 674A, 674B. Further, implement hydraulic circuit 1008 includes conduits 1010, 1012, a bypass control valve 1032, braking valves 1034, 1036, check valves 1040, 1044, 1050, 1060, and orifice 1048, which are configured similar to the conduits 710, 712, 910, 912, bypass control valves 732, 932, braking valves 734, 736, 936, check valves 740, 744, 750, 760, 940, 944, 950, and orifices 748, 948 of implement hydraulic circuits 708, 908, respectively, in FIGS. 7A-7C and 8A-8C. Also, implement hydraulic circuit 1008 further includes flushing valve 1068 and flow regulating valve 1070, which are configured similar to the flushing valve 968 and the flow regulating valve 970 of implement hydraulic circuit 908 in FIGS. 8A-8C. Moreover, in the illustrated example, the implement hydraulic circuit 1008 includes a hydraulic braking circuit 1030 (indicated by dashed box in FIGS. 9A-9D) such that the hydraulic system 1002 is configured to operate in an implement operating mode (shown in FIG. 9A), a first implement braking mode (shown in FIG. 9C), and a second implement braking mode (shown in FIG. 9D).

In some aspects, however, the hydraulic system 1002 and the implement 1000 shown in FIGS. 9A-9D differs from the hydraulic systems 702, 902 and the implements 700, 900 shown in FIGS. 7A-7C and 8A-8C, respectively. In particular, the hydraulic system 1002 is further configured to operate in an implement idle mode (shown in FIG. 9B), in which the implement hydraulic circuit 1008 recirculates a portion of motor outlet flow to provide adequate fluid flow through the motor 1004 to prevent cavitation (such as, e.g., when the power machine 600 is idling). More specifically, the implement hydraulic circuit 1008 further includes an anti-cavitation conduit 1080 in communication with the conduits 1010, 1012 and an anti-cavitation valve 1082 arranged along the conduit 1080. In addition, an anti-cavitation check valve 1084, a reverse flow check valve 1086, and an orifice 1088 are arranged along the conduit 1012, with the orifice 1088 arranged to balance the check valves 1084, 1086.

Referring specifically to FIG. 9A, with the hydraulic system 1002 operating in the implement operating mode, pressurized fluid is provided from the control valve 690 in the first direction 696A to the implement hydraulic circuit 1008 along conduit 1010, passes through the anti-cavitation check valve 1084, then passes through the motor 1004 via, in series, a motor port 1024 (e.g., an inlet port as discussed below) and a motor port 1026 (e.g., an outlet port as discussed below). The flow can then return to the control valve 690 along an operating or driving flow path (i.e., a first path) as represented by arrows 1018A. Pressurized flow along conduit 1010 causes the anti-cavitation valve 1082 to shift to the position shown in FIG. 9A, permitting flow along conduit 1080 through the anti-cavitation valve 1082. Further, flow along conduit 1010 also causes the flushing valve 1068 to shift to the position shown in FIG. 9A. Thus, the flushing valve 1068 permits a portion of flow along conduit 1012 to be diverted to flow along a flushing flow path as represented by arrows 1018E, through the flow regulating valve 1070 and the flushing valve 1068 and along the flushing conduit 1064 to a flushing port 1066 of the motor 1004. A portion of the fluid provided to the flushing port 1066 along the flushing path 1018E may flow out of the motor port 1026 and through the heat exchanger 692 back to the reservoir 684 along the operating flow path 1018A, while another portion may flow out of a drain port 1062 of the motor 1004 and directly back to the reservoir 684 along the case drain line 686.

Referring to FIG. 9B, with the hydraulic system 1002 operating in the implement idle mode, flow (and pressure) of fluid along the operating flow path 1018A is reduced compared to that of the implement operating mode (e.g., due to decreased operation of a power source (not shown) of the power machine 600). As a result, a portion of flow from the motor port 1026 along operating flow path 1018A flows along conduit 1080 through the anti-cavitation valve 1082 and back to the motor port 1024 along an anti-cavitation flow path as represented by arrows 1018F, while another portion of flow from the motor port 1026 returns to the control valve 690 along operating flow path 1018A. Such flow along the anti-cavitation path 1018F to the motor 1004 can reduce (or prevent) cavitation within the motor 1004 that may otherwise result from reduced flow of fluid from the control valve 690. In addition, reduced flow of fluid from the control valve 690 causes the flushing valve 1068 to shift to the position shown, blocking flow along the flushing path 1018E (see FIG. 9A).

Continuing, the hydraulic system 1002 can be configured to shift to the first implement braking mode (shown in FIG. 9C) from either of the implement operating mode (shown in FIG. 9A) or the implement idle mode (shown in FIG. 9B). With the hydraulic system 1002 operating in the first implement braking mode (shown in FIG. 9C), the control valve 690 ceases flow of pressurized fluid to the implement hydraulic circuit 1008, which causes the anti-cavitation valve 1082 to shift to the position shown, blocking flow along the conduit 1080. This buildup of pressure along conduit 1080 causes the second braking valve 1034 to shift to the position shown, which permits flow from the motor port 1026 through the second braking valve 1034, through check valve 1044, and back to the motor port 1024. Further, in the case that the hydraulic system 1002 is shifting from the implement operating mode (shown in FIG. 9C), the flushing valve 1068 can also be caused to shift to the position shown, blocking flow along the flushing conduit 1064. Thus, a recirculating hydraulic flow on the implement 1000 can be circulated through the motor 1004 along a first braking flow path as represented by arrows 1018B (as also similarly discussed relative to FIGS. 7B and 8B).

When the hydraulic system 1002 shifts to the second implement braking mode (shown in FIG. 9D), pressurized fluid is provided from the control valve 690 to the implement hydraulic circuit 1008 in the second direction 696B, which can cause the flushing valve 1068 and the anti-cavitation valve 1082 to remain in the blocked positions as shown (or shift the valves 1068, 1082 to those positions, in some cases). Fluid provided in the second direction 696A passes through check valve 1050 and provides suitable pressure at node 1052 to shift bypass control valve 1032 into the position shown. The shifted bypass control valve 1032 blocks flow returning from the motor port 1026 from flowing through bypass control valve 1032, thereby causing a pressure buildup that shifts the braking valve 1036 to allow flow to return to the control valve 690 following a return flow path 1018D through the valve 1036, along conduit 1056 to conduit 1010, and through check valve 1086. Simultaneously, and also as a result of the illustrated configuration of the bypass control valve 1032, fluid from the machine hydraulic system 602 is provided to the motor 1004 via a second braking flow path 1018C that passes through bypass control valve 1032 to conduit 1010 and thus to the motor 1004 at the motor port 1024.

Figure 9D:
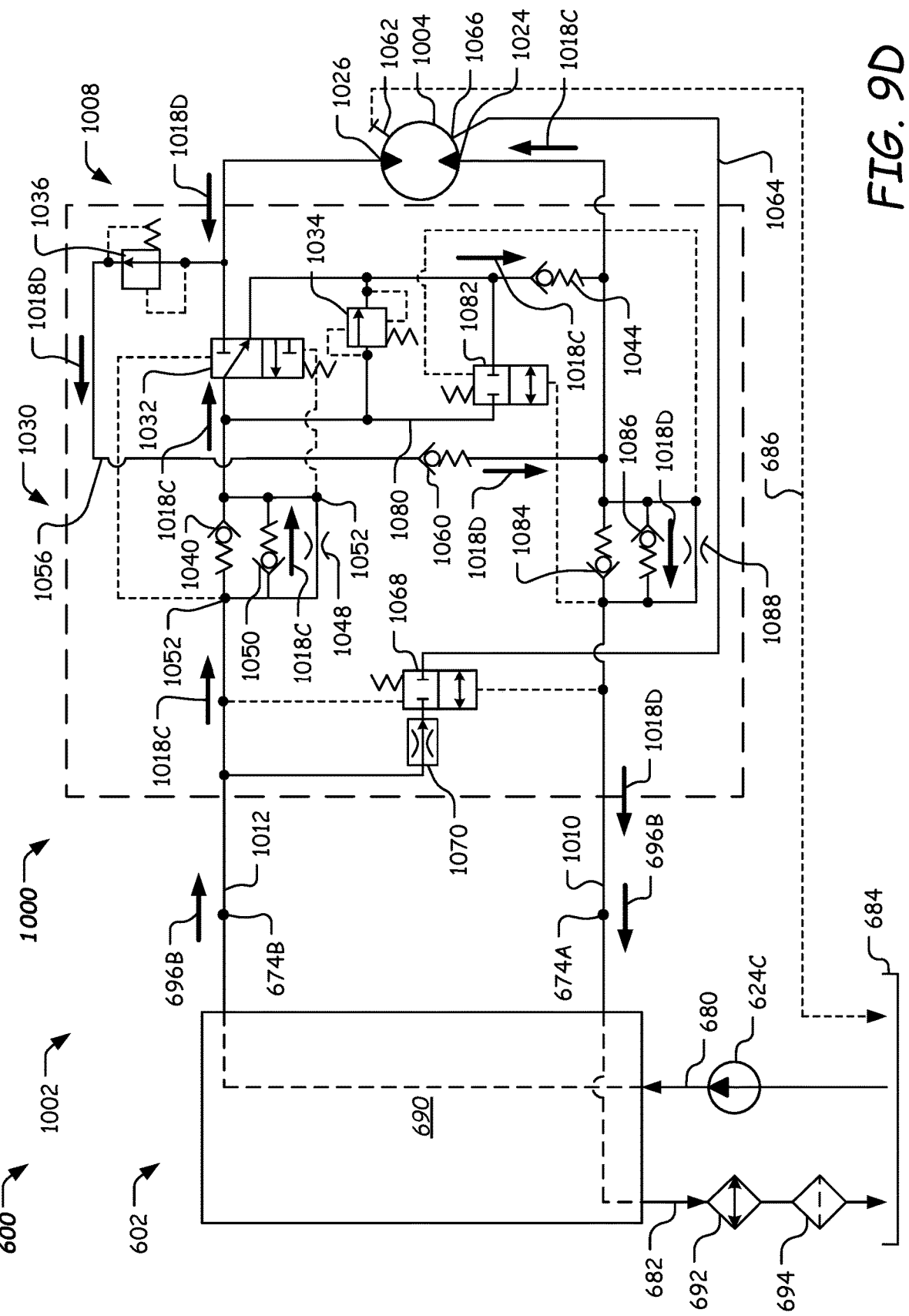

In the braking mode as illustrated in FIG. 9D, as similarly discussed above relative to FIGS. 7C and 8C, flow of hydraulic fluid along the return flow path 1018D can be divided in some cases between a return flow to the machine hydraulic system 602 (and the cooler 692) and a supplemental flow to the motor 1004. Thus, for example, depending on the rotational speed of the motor 1004 and the flow rate of hydraulic fluid along the braking flow path 1018C, supplemental flow from the return flow path 1018D can be automatically diverted to the motor 1004 to help prevent cavitation. In this regard, the flow and motor speed relationships illustrated in FIG. 7D also generally apply to operation of the hydraulic system 1002.

In some examples, devices or systems disclosed herein can be utilized or configured for operation using methods embodying aspects of the disclosed technology. Correspondingly, description herein of particular features, capabilities, or intended purposes of a device or system is generally intended to inherently include disclosure of a method of using such features for the intended purposes, a method of implementing such capabilities, and a method of configuring disclosed (or otherwise known) components to support these purposes or capabilities. Similarly, unless otherwise indicated or limited, discussion herein of any method of manufacturing or using a particular device or system, including configuring the device or system for operation, is intended to inherently include disclosure, as examples of the disclosed technology, of the utilized features and implemented capabilities of such device or system.

In some implementations, methods of braking an implement (e.g., a high-energy rotary implement) can utilize the heat-rejection capabilities of a hydraulic system of a power machine to quickly and efficiently dissipate kinetic energy of an implement that is operably connected to the power machine, including as can provide particular operational characteristics in particular braking modes. For example, for an implement that, when operating at a maximum rotational speed, generates at least 50 kilojoules (kJ) of kinetic energy (e.g., as the rotational kinetic energy of a rotary member), operation in a particular braking mode can cause braking of the rotary implement to less than 5% of a maximum rotational speed within a particular time (e.g., 30 seconds) after the relevant braking mode is initiated. Thus, for example, a cutting disc or other rotary member with a rotational kinetic energy of 50 kJ can be braked to exhibit less than 1% (e.g., 0.25% or less) of pre-braking rotational kinetic energy within 30 seconds after a relevant braking mode is initiated. In some operating modes, similar timed reduction to lower speeds can also be possible (e.g., braking to less than 1% of a maximum rotational speed within 30 seconds). In some operating modes, similar relative reductions in rotational speed can be implemented for attachments that generate at least 250 kJ at a maximum rotational speed, or for attachments that generate at least 1000 kJ at a maximum rotational speed. For example, in some braking modes, such attachments can also be braked to exhibit less than 5% (e.g., less than 1%) of a maximum rotational speed or less than 1% (e.g., less than 0.01%) of a maximum rotational kinetic energy within 30 seconds after a relevant braking mode is initiated.

Figure 10:
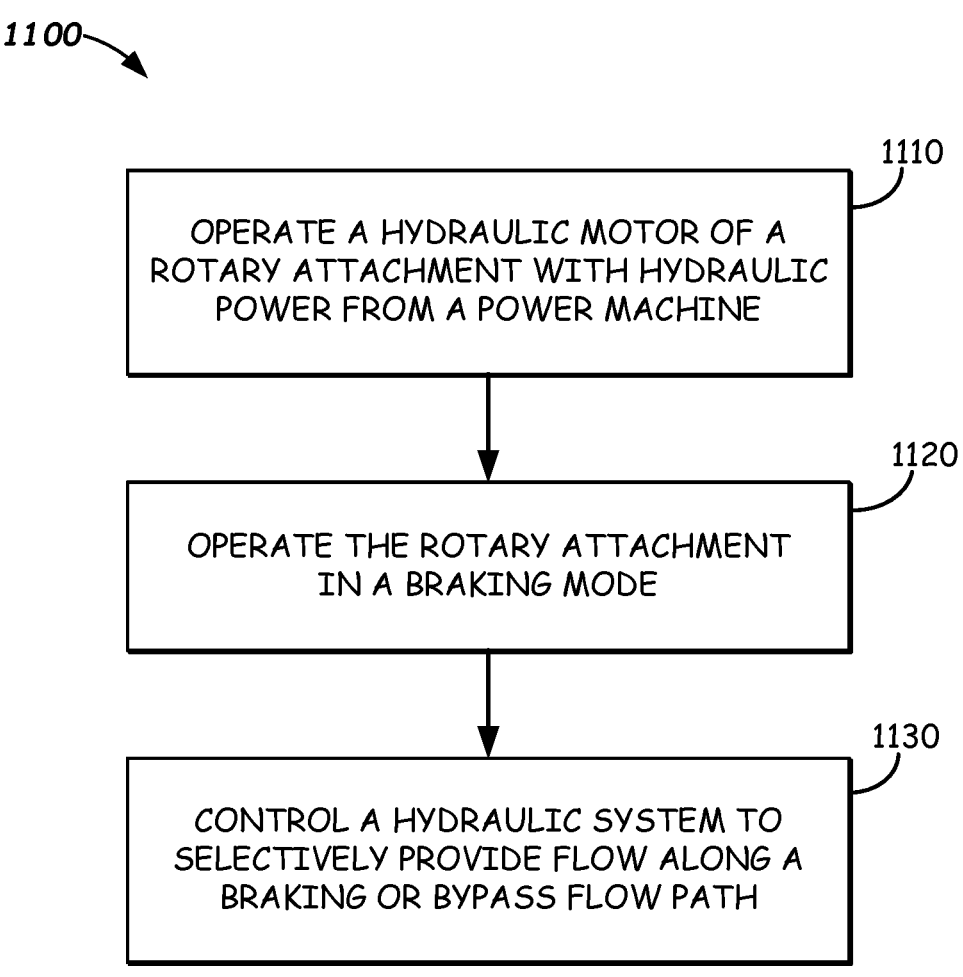
FIG. 10 is a schematic representation of a method for braking a rotary implement of a power machine according to examples of the present disclosure.

Correspondingly, some examples can include a method for control of operation of a power machine that includes a rotary implement that is powered hydraulic flow from the power machine and is configured to provide an implement braking mode. As one example, FIG. 10 illustrates a method 1100 for operating a power machine having a rotary implement in an implement braking mode to brake the rotary implement, as can be implemented using one or more computing or other (e.g., hydraulic) control devices. At block 1110 of the illustrated method 1100, the method can include operating a rotary implement with power from a power machine, including by powering rotation of a hydraulic motor of the rotary implement with flow from a hydraulic system of the power machine. For example, as variously described above, one or more pumps and control valves of a power machine can be operated to provide hydraulic power to an implement and thereby power rotation of a hydraulic motor operably coupled to a rotary element (e.g., a high-energy cutting implement).

At block 1120, the method 1100 can include operating the rotary implement in a braking mode to brake the rotary implement. In particular, as shown at block 1130, operations at block 1120 can include controlling an implement or power machine hydraulic system (e.g., both) to provide continued flow of hydraulic fluid through the rotary implement selectively along one or more of a first flow path and a second flow path, the second flow path being an alternate flow path from the first flow path that provides braking or bypass flow for the implement. For example, as variously discussed above, an implement hydraulic system can be controlled to provide braking or bypass flow paths so that heat from braking can be transferred to the power machine by a flow hydraulic fluid from the implement. In some cases, control at block 1130 can include providing a command to a master control valve for a hydraulic system of a power machine (e.g., using various generally known control systems for changing a position of a valve spool). For example, a forward flow position of the master control valve can correspond to powered operation of an implement motor, a centered flow position of the master control valve can correspond to recirculating braking on board the implement (e.g., and no flow from the power machine to the implement), and a reverse flow position of the master control valve can correspond to braking of the implement using flow from the power machine.

Thus, for example, including using the various hydraulic systems presented above, some methods according to this disclosure can reduce rotation of an inertial rotary implement (e.g., a cutting blade or other implement with a moment of inertia about a rotational axis of 100 kg-m 2 or more) to less than 5% of a maximum rotational velocity within a relatively short amount of time (e.g., 30 seconds or less) after braking mode and corresponding hydraulic flow control are initiated for the implement.

In some examples, control of braking for an implement (e.g., in an implement braking mode) can be implemented based on a user input (e.g., by a user input device in an operator station of the relevant power machine). In some examples, control of braking for an implement can be implemented automatically. For example, upon a user commanding a stop to powered operation by powering down an implement or a power machine, an electronic control system of the power machine (or implement) can temporarily continue to provide powered hydraulic flow to the implement (e.g., by one or more on-board pumps of the power machine) while also controlling an implement hydraulic system to implement a hydraulic braking mode (e.g., as variously discussed above).

In some examples, aspects of the present disclosure, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, examples of the disclosed technology can be implemented as a set of instructions, tangibly embodied on a non-transitory computer-readable media, such that a processor device can implement the instructions based upon reading the instructions from the computer-readable media. Some examples of the disclosed technology can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the present disclosure, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular examples of the disclosed technology. Further, in some examples, certain operations can be executed in parallel, including by dedicated parallel processing devices, or separate computing devices configured to interoperate as part of a large system.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon)

and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Although the present disclosure has been described by referring preferred examples, workers skilled in the art will recognize that changes may be made in form and detail without departing from the scope of the discussion.

What is claimed is:

1. A hydraulic-powered rotary implement configured to be attached to a power machine, the rotary implement comprising:

a hydraulic motor having a motor inlet and a motor outlet; and an implement hydraulic circuit in fluid communication with the motor inlet and the motor outlet, the implement hydraulic circuit having a first interface hydraulic port and a second interface hydraulic port configured to be removably secured in fluid communication with a hydraulic system of a power machine to provide flow into the implement hydraulic circuit from the power machine and flow from the implement hydraulic circuit to the power machine;

wherein the implement hydraulic circuit:

in an operating configuration, routes a driving hydraulic flow, received at one of the first interface hydraulic port or the second interface hydraulic port, through the hydraulic motor to drive the hydraulic motor; and in a braking configuration, routes a braking hydraulic flow, received at one of the first interface hydraulic port or the second interface hydraulic port, from the power machine through the hydraulic motor to brake the hydraulic motor.

2. The rotary implement of claim 1, wherein, in the operating configuration, the implement hydraulic circuit routes the driving hydraulic flow from the first interface hydraulic port to the motor inlet, and from the motor outlet to the second interface hydraulic port; and wherein, in the braking configuration, the implement hydraulic circuit routes the braking hydraulic flow from the second interface hydraulic port to the motor inlet, and from the motor outlet to the first interface hydraulic port.

3. The rotary implement of claim 1, wherein the implement hydraulic circuit includes a brake valve arranged along a return flow path that extends between the motor outlet and the first interface hydraulic port, the brake valve being configured:

to be in a first position in response to a first pressure at the motor outlet, to block flow from the motor outlet across the brake valve; and to move from the first position to a second position in response to a second pressure at the motor outlet that is greater than the first pressure, to permit flow from the motor outlet, across the brake valve, to the first interface hydraulic port.

4. The rotary implement of claim 3, wherein the brake valve is a pressure relief valve.

5. The rotary implement of claim 3, wherein the implement hydraulic circuit further includes a bypass control valve configured to be in a first position in the operating configuration and a second position in the braking configuration, wherein:

in the operating configuration, the bypass control valve in the first position permits flow of fluid having the first pressure to bypass the brake valve, to flow from the motor outlet to the second interface hydraulic port; and in the braking configuration, the bypass control valve in the second position blocks flow of fluid from the motor outlet to the second interface hydraulic port.

6. The rotary implement of claim 5, wherein, the bypass control valve in the second position permits flow through the bypass control valve from the second interface hydraulic port to the motor inlet.

7. The rotary implement of claim 5, wherein the implement hydraulic circuit further includes:

a second brake valve configured to move from a first position to a second position in response to fluid flow having a third pressure that is less than the second pressure, to route a second braking flow from the motor outlet, across the second brake valve, to the motor inlet, in a second braking configuration of the implement hydraulic circuit.

8. The rotary implement of claim 7, wherein, in the second braking configuration, the bypass control valve is in the first position so that fluid from the motor outlet bypasses the brake valve, to flow from the motor outlet to the motor inlet via the second brake valve.

9. The rotary implement of claim 5, wherein the bypass control valve is a pilot-operated valve arranged to be moved between the first and second positions based on a sensed pressure between the bypass control valve and the second interface hydraulic port.

10. The rotary implement of claim 1, wherein the implement hydraulic circuit, in the operating configuration, is configured to route a portion of the driving hydraulic flow along an anti-cavitation flow path to return the portion of the driving hydraulic flow from the motor outlet to the motor inlet.

11. The rotary implement of claim 10, wherein the implement hydraulic circuit includes an anti-cavitation control valve configured to permit flow of the portion of the driving hydraulic flow along the anti-cavitation flow path based on a sensed pressure between the first interface hydraulic port and the motor inlet.

12. The rotary implement of claim 11, wherein the implement hydraulic circuit further includes a braking valve arranged in parallel with the anti-cavitation control valve relative to flow from the motor outlet and the motor inlet.

13. A method of operating a hydraulic-powered rotary implement that is attached to a power machine, the method comprising:

with an implement hydraulic circuit of the rotary implement in an operating configuration, powering rotation of a hydraulic motor of the rotary implement by providing a driving hydraulic flow from a power machine hydraulic system to the implement hydraulic circuit via one of a first interface hydraulic port or a second interface hydraulic port that provide hydraulic communication between the implement hydraulic circuit and the power machine hydraulic system; and with the implement hydraulic circuit in a braking configuration, braking rotation of the hydraulic motor by providing a braking hydraulic flow from the power machine hydraulic system to the implement hydraulic circuit via one of the first interface hydraulic port or the second interface hydraulic port, the braking hydraulic flow returning from the implement hydraulic circuit to the power machine hydraulic system to be cooled by a hydraulic cooler of the power machine.

14. The method of claim 13, wherein the driving hydraulic flow is provided by the power machine to the implement hydraulic circuit via the first interface hydraulic port, flows across the hydraulic motor from a motor inlet to a motor outlet, and returns from the implement hydraulic circuit to the power machine hydraulic system via the second interface hydraulic port; and wherein the braking hydraulic flow is provided by the power machine to the implement hydraulic circuit via the second interface hydraulic port, flows across the hydraulic motor from the motor inlet to the motor outlet, and returns from the implement hydraulic circuit to the power machine hydraulic system via the first interface hydraulic port.

15. The method of claim 13, wherein the implement hydraulic circuit includes a brake valve and a bypass control valve; and wherein in the braking configuration:

the bypass control valve provides a bypass flow path from the second interface hydraulic port to a motor inlet, to provide flow across the hydraulic motor from the motor inlet to a motor outlet;

the brake valve provides a return flow path from the motor outlet to the first interface hydraulic port to brake the hydraulic motor.

16. The method of claim 15, wherein the implement hydraulic circuit in the braking configuration:

causes a first portion of the braking hydraulic flow to flow from the bypass control valve to the first interface hydraulic port without flowing across the hydraulic motor; and causes a second portion of the braking hydraulic flow to flow to across the hydraulic motor to the brake valve and the return flow path.

17. The method of claim 13, further comprising:

with the implement hydraulic circuit in a second braking configuration, braking rotation of the hydraulic motor with a recirculating hydraulic flow within the implement hydraulic circuit.

18. The method of claim 17, wherein the driving hydraulic flow is provided by the power machine hydraulic system in response to a first operator command for a master spool valve of the power machine hydraulic system and causes the implement hydraulic circuit to operate in the operating configuration;

wherein the braking hydraulic flow is provided by the power machine hydraulic system in response to a second operator command for the master spool valve and causes the implement hydraulic circuit to operate in the braking configuration; and wherein no flow is provided from the power machine hydraulic system in response to a third operator command for the master spool valve, to cause the implement hydraulic circuit to operate in the second braking configuration.

19. A hydraulic-powered rotary implement for a power machine, the rotary implement comprising:

a hydraulic motor having a motor inlet and a motor outlet; and an implement hydraulic circuit providing hydraulic communication between (i) a first interface hydraulic port for flow to or from a power machine hydraulic system of the power machine and (ii) a second interface hydraulic port for flow to or from the power machine hydraulic system, the first and second interface hydraulic ports being fluidically coupled to the motor inlet and the motor outlet for flow between the power machine hydraulic system, the motor inlet, and the motor outlet and configured to be removably secured to the power machine hydraulic system of the power machine;

wherein the implement hydraulic circuit includes a braking flow circuit that provides fluid communication: between the motor outlet and an inlet of a brake valve of the implement hydraulic circuit; between an outlet of the brake valve and the motor inlet; and between the outlet of the brake valve and the first interface hydraulic port for outflow from the implement hydraulic circuit to the power machine hydraulic system.

20. The rotary implement of claim 19, wherein, in a braking configuration, the implement hydraulic circuit is configured to divide hydraulic flow, received from the outlet of the brake valve, between the motor inlet and the first interface hydraulic port.

* * * * *